US010618379B2

(12) United States Patent
Aikawa et al.

(10) Patent No.: US 10,618,379 B2
(45) Date of Patent: *Apr. 14, 2020

(54) CONTROL APPARATUS OF HEAT EXCHANGING SYSTEM

(71) Applicant: TOYOTA JIDOSHA KABUSHIKI KAISHA, Toyota-shi, Aichi-ken (JP)

(72) Inventors: Hidefumi Aikawa, Sunto-gun (JP); Yoichi Ogura, Sunto-gun (JP); Masatoshi Yano, Hadano (JP); Yuji Miyoshi, Susono (JP); Yu Ofune, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

This patent is subject to a terminal disclaimer.

(21) Appl. No.: 16/027,631

(22) Filed: Jul. 5, 2018

(65) Prior Publication Data

US 2019/0009645 A1     Jan. 10, 2019

(30) Foreign Application Priority Data

Jul. 10, 2017 (JP) ................... 2017-134510

(51) Int. Cl.
*G05D 23/00* (2006.01)
*B60H 1/00* (2006.01)
(Continued)

(52) U.S. Cl.
CPC ..... *B60H 1/00885* (2013.01); *B60H 1/00892* (2013.01); *B60H 1/025* (2013.01);
(Continued)

(58) Field of Classification Search
CPC ......... B60H 1/00885; B60H 1/12; F01P 3/20; F01P 5/10; F01P 7/16; F01P 2025/08;
(Continued)

(56) References Cited

U.S. PATENT DOCUMENTS 9,623,720 B2 *  4/2017  Roth ................. F24V 40/00
2017/0253104 A1  9/2017  Amano et al.
(Continued)

FOREIGN PATENT DOCUMENTS

| JP | 2016-053342 A | 4/2016 |
| JP | 2016-107979 | 6/2016 |
| WO | WO2017/056868 A1 | 4/2017 |

OTHER PUBLICATIONS

Office Action issued in U.S. Appl. No. 16/027,604 dated Oct. 11, 2019.
(Continued)

*Primary Examiner* — Davis D Hwu
(74) *Attorney, Agent, or Firm* — Finnegan, Henderson, Farabow, Garrett & Dunner, LLP

(57) ABSTRACT

A control apparatus of a heat exchanging apparatus according to the invention executes a control for activating a connection system to connect an engine water passage to a heater water passage and then, executes a control for decreasing a heater pump duty ratio and a control for decreasing an engine pump duty ratio when the control for decreasing the heater pump duty ratio and the control for decreasing the engine pump duty ratio are requested to be executed in order to control a core flow rate to a requested core flow rate and an engine flow rate to a requested engine flow rate after the engine water passage is connected to the heater water passage by the connection system.

8 Claims, 18 Drawing Sheets

(51) Int. Cl.
  *B60H 1/12*    (2006.01)
  *F01P 3/20*    (2006.01)
  *F01P 7/16*    (2006.01)
  *F01P 5/10*    (2006.01)
  *B60H 1/02*    (2006.01)

(52) U.S. Cl.
  CPC .................. *B60H 1/12* (2013.01); *F01P 3/20* (2013.01); *F01P 5/10* (2013.01); *F01P 7/16* (2013.01); *F01P 2005/105* (2013.01); *F01P 2025/08* (2013.01); *F01P 2060/08* (2013.01)

(58) Field of Classification Search
  CPC ......... F01P 2060/08; F01P 7/14; F25B 29/00; F24V 40/00
  USPC ....................................................... 165/296
  See application file for complete search history.

(56) References Cited

U.S. PATENT DOCUMENTS

2017/0326945 A1   11/2017  Hatakeyama et al.
2018/0238223 A1    8/2018  Enomoto et al.
2019/0030989 A1*   1/2019  Miura .................... F25B 29/00

OTHER PUBLICATIONS

Notice of Allowance issued in U.S. Appl. No. 16/027,586 dated Oct. 21, 2019.
Notice of Allowance issued in U.S. Appl. No. 16/027,604 dated Dec. 11, 2019.
Notice of Allowance issued in U.S. Appl. No. 16/027,586 dated Jan. 14, 2020.

* cited by examiner

CONTROL APPARATUS OF HEAT EXCHANGING SYSTEM

BACKGROUND

Field

The invention relates to a control apparatus of a heat exchanging system including a heater core heating system for heating a heater core for heating air supplied to an interior of a vehicle for warming the interior of the vehicle by heat exchanging water, and an engine cooling system for cooling an internal combustion engine by the heat exchanging water.

Description of the Related Art

A control apparatus of the heat exchanging system including the heater core heating system and the engine cooling system is known (for example, see JP 2016-107979 A). The heater core heating system of the known heat exchanging system includes a heater water passage, through which the heat exchanging water flows, and a heater pump for circulating the heat exchanging water through the heater water passage. Further, the engine cooling system of the known heat exchanging system includes an engine water passage, through which the heat exchanging water flows, and an engine pump for circulating the heat exchanging water through the engine water passage.

Further, the known heat exchanging system includes a connection system for connecting the engine water passage and the heater water passage to each other. The known control apparatus applied to the known heat exchanging system separates the heater water passage from the engine water passage when a temperature of the heat exchanging water for cooling the internal combustion engine, is lower than a predetermined temperature.

On the other hand, when the temperature of the heat exchanging water for cooling the internal combustion engine, is equal to or higher than the predetermined temperature, the known control apparatus is configured to connect the engine water passage to the heater water passage to supply the heat exchanging water having a temperature increased by cooling the engine, thereby heating the heater core by heat of the heat exchanging water.

It is requested for the heat exchanging system to activate the heater pump such that the heat exchanging water is supplied to the heater core at a requested core flow rate. The requested core flow rate is a flow rate necessary to be supplied to the heater core for maintaining a temperature of the heater core at a predetermined temperature.

When the engine water passage is connected to the heater water passage, a flow resistance of the heat exchanging system changes. Thus, a core flow rate which is a flow rate of the heat exchanging water supplied to the heater core, changes when duty ratios of the heater and engine pumps after the engine water passage is connected to the heater water passage, are the same as the duty ratios of the heater and engine pumps before the engine water passage is connected to the heater water passage, respectively.

Therefore, when the engine water passage is connected to the heater water passage while the heat exchanging water having the requested core flow rate, is supplied to the heater core, the core flow rate may decrease below the requested core flow rate. When the core flow rate decreases below the requested core flow rate, a temperature of the air (warmed air) supplied to the interior of the vehicle for warming the interior of the vehicle, may decrease. Thus, persons in the vehicle may feel discomfort.

SUMMARY

The invention has made for solving the above-described problems. An object of the invention is to provide a control apparatus of a heat exchanging system capable of connecting an engine water passage to a heater water passage, preventing the core flow rate from decreasing below the requested core flow rate.

A heat exchanging system, to which a control apparatus according to the invention is applied, includes a heater core heating system (30), an engine cooling system (10), and a connection system (60).

The heater core heating system (30) heats a heater core (31) by heat exchanging water. The heater core heats air to be supplied to an interior of a vehicle to warm the interior of the vehicle. The heater core heating system (30) includes a heater water passage (40, 33W, 41, 31W, 42, 43, 34W, 44), through which the heat exchanging water flows, a heat exchanger (33, 34) for heating the heat exchanging water flowing through the heater water passage, and a heater pump (32) for flowing the heat exchanging water through the heater water passage.

The engine cooling system (10) cools an internal combustion engine (11) by the heat exchanging water. The engine cooling system (10) includes an engine water passage (16, 11W, 17, 18, 12W, 19), through which the heat exchanging water flows, and an engine pump (15) for flowing the heat exchanging water through the engine water passage.

The connection system (60) connects the engine water passage (16, 11W, 17, 18, 12W, 19) to the heater water passage (40, 33W, 41, 31W, 42, 43, 34W, 44) such that the heat exchanging water flows into the heater water passage from the engine water passage and flows out from the heater water passage into the engine water passage.

The control apparatus comprises an electronic control unit (90) for controlling activations of he heater pump (32), the engine pump (15), and the connection system (60).

The electronic control unit (90) is configured to control a heater pump duty ratio (DH) for activating the heater pump (32) such that a core flow rate (Vhc) corresponds to a requested core flow rate (Vhc_req) (see a process of a step 1390 in FIG. 13 and a process of a step 1425 in FIG. 14) when a warming condition that a warming of the interior of the vehicle is requested, is satisfied (see a determination "Yes" at a step 1420 in FIG. 14). The core flow rate (Vhc) is a flow rate of the heat exchanging water flowing through the heater core (31). The requested core flow rate (Vhc_req) is a flow rate of the heat exchanging water requested to flow through the heater core (31).

The electronic control unit (90) is configured to control an engine pump duty ratio (DE) for activating the engine pump (15) such that an engine flow rate (Veng) corresponds to a requested engine flow rate (Veng_req) (see the process of the step 1390 in FIG. 13 and a process of a step 1410 in FIG. 14) when an engine circulation condition that the heat exchanging water is requested to circulate in the engine water passage (16, 11W, 17, 18, 12W, 19), is satisfied (see a determination "Yes" at a step 1405 in FIG. 14). The engine flow rate (Veng) is a flow rate of the heat exchanging water flowing through the engine water passage (16, 11W, 17, 18, 12W, 19). The requested engine flow rate (Veng_req) is a flow rate of the heat exchanging water requested to flow through the engine water passage.

The electronic control unit (90) is configured to activate the connection system (60) to connect the engine water passage (16, 11W, 17, 18, 12W, 19) to the heater water passage (40, 33W, 41, 31W, 42,43, 34W, 44) and control the heater pump duty ratio (DH) and the engine pump duty ratio (DE) such that the core flow rate (Vhc) corresponds to the requested core flow rate (Vhc_req) and the engine flow rate (Veng) corresponds to the requested engine flow rate (Veng_req) (see processes of steps 1320, 1360 and 1370 in FIG. 13) when a connection condition including a condition that the warming condition is satisfied, is satisfied (see a determination "Yes" at a step 1310 in FIG. 13).

The electronic control unit (90) is configured to execute a control for activating the connection system (60) to connect the engine water passage (16, 11W, 17, 18, 12W, 19) to the heater water passage (40, 33W, 41, 31W, 42, 43, 34W, 44) and then, execute a control for decreasing the heater pump duty ratio (DH) and a control for decreasing the engine pump duty ratio (DE) (see the process of the step 1360 in FIG. 13) when a particular condition that the control for decreasing the heater pump duty ratio (DH) and the control for decreasing the engine pump duty ratio (DE) are requested to be executed in order to control the core flow rate (Vhc) to the requested core flow rate (Vhc_req) and the engine flow rate (Veng) to the requested engine flow rate (Veng_req) after the engine water passage is connected to the heater water passage by the connection system (60), is satisfied (see a determination "Yes" at a step 1350 in FIG. 13).

When the heater pump duty ratio decreases while the engine water passage is not connected to the heater water passage, the care flow rate decreases. Thus, the core flow rate may decrease below the requested core flow rate. As described above, when the core flow rate decreases below the requested core flow rate, the temperature of the air (i.e., the warmed air) supplied to the interior of the vehicle may decrease and thus, the person(s) in the vehicle may feel discomfort.

When the engine water pump is connected to the heater water passage, a flow resistance of the heat exchanging system including the engine water passage and the heater water passage, decreases. Thus, when the heater pump duty ratio and the engine pump duty ratio after the engine water passage is connected to the heater water passage, is the same as the heater pump duty ratio and the engine pump duty ratio before the engine water passage is connected to the heater water passage, respectively, the core flow rate increases after the engine water passage is connected to the heater water passage.

When the engine pump duty decreases before the engine water passage is connected to the heater water passage, the engine water passage is connected to the heater water passage while the engine flow rate decreases. Thus, even when the flow resistance of the heat exchanging system decreases due to a connection of the engine water passage to the heater water passage, the engine flow rate decreases and thus, the core flow rate may decrease below the requested core flow rate. Therefore, also in this case, the temperature of the air (i.e., the warmed air) supplied to the interior of the vehicle may decrease and thus, the person(s) in the vehicle may feel discomfort.

The control apparatus according to the invention has not executed the control for decreasing the heater pump duty ratio and the control for decreasing the engine pump duty ratio when the control apparatus connects the engine water passage to the heater water passage. Therefore, the flow resistance of the heat exchanging system decreases. As a result, the engine flow rate and the core flow rate increase. Therefore, the core flow rate is unlikely to decrease below the requested core flow rate when the control apparatus according to the invention executes the control for decreasing the heater pump duty ratio and the control for decreasing the engine pump duty ratio.

The electronic control unit (90) may be configured to execute the control for decreasing the heater pump duty ratio (DH) and the control for decreasing the engine pump duty ratio (DE) after the core flow rate (Vhc) starts to increase after the electronic control unit (90) executes the control for activating the connection system (60) to connect the engine water passage (16, 11W, 17, 18, 12W, 19) to the heater water passage (40, 33W, 41, 31W, 42, 43, 34W, 44) (see the process of the step 1360 in FIG. 13) when the particular condition is satisfied (see the determination "Yes" at the step 1350 in FIG. 13).

When the heater pump duty ratio decreases, the core flow rate decreases. According to the invention, the core flow rate has increased when the heater pump duty ratio decreases. Thus, it is ensured that the core flow rate is unlikely to decrease below the requested core flow rate.

The heat exchanging system may be configured such that a flow direction of the heat exchanging water in a particular water passage portion of the heater water passage (40, 33W, 41, 31W, 42, 43, 34W, 44) between a portion of the heater water passage into which the heat exchanging water flows from the engine water passage (16, 11W, 17, 18, 12W, 19) and a portion of the heater water passage from which the heat exchanging water flows out toward the engine water passage when the engine water passage is not connected to the heater water passage, is opposite to the flow direction of the heat exchanging water in the particular water passage portion when the engine water passage is connected to the heater water passage. In this case, the heater core heating system (30) may include an exhaust heat recovery device (34) in the particular water passage, the exhaust heat recovery device (34) being configured to heat the heat exchanging water circulating in the heater water passage (40, 33W, 41, 31W, 42, 43, 34W, 44) by heat of exhaust gas discharged from the internal combustion engine (11). In this case, the electronic control unit (90) may be configured to execute the control for decreasing the engine pump duty ratio (DE) after the electronic control unit (90) executes the control for decreasing the heater pump duty ratio (DH) (see the process of the step 1360 in FIG. 13) when the particular condition is satisfied (see the determination "Yes" at the step 1350 in FIG. 13).

When the engine water passage is connected to the heater water passage, a flow direction of the heat exchanging water in the particular water passage reverses. Therefore, when the engine pump duty ratio decreases before the heater pump duty ratio decreases, an amount of the heat exchanging water flowing through the particular water passage decreases. As a result, an amount of the heat exchanging water flowing through the exhaust heat recovery device decreases. In this case, the amount of the heat exchanging water flowing through the exhaust heat recovery device decreases below an amount of the heat exchanging water necessary to flow through the exhaust heat recovery device for preventing the exhaust heat recovery device from overheating. When the amount of the heat exchanging water flowing through the exhaust heat recovery device is small, the exhaust heat recovery device may overheat.

On the other hand, when the heater pump duty ratio decreases before the engine pump duty ratio decreases, the amount of the heat exchanging water flowing through the exhaust heat recovery device does not decrease, but may increase.

According to the invention, the heater pump duty ratio decreases before the engine pump duty ratio decreases. Thus, the amount of the heat exchanging water flowing through the exhaust heat recovery device is unlikely to decrease below the amount of the heat exchanging water necessary to flow through the exhaust heat recovery device for preventing the exhaust heat recovery device from overheating. Thus, it is ensured that the exhaust heat recovery device is prevented from overheating.

The connection condition may include a condition that the engine circulation condition is satisfied.

The connection condition may include a condition that a first temperature of the heat exchanging water circulating in the engine water passage (16, 11W, 17, 18, 12W, 19) is higher than a second temperature of the heat exchanging water circulating in the heater water passage (40, 33W, 41, 31W, 42, 43, 34W, 44) when the engine water passage is not connected to the heater water passage.

According to the invention, the temperature of the heat exchanging water circulating in the engine water passage is higher than the temperature of the heat exchanging water circulating in the heater water passage. Thus, the temperature of the heat exchanging water circulating in the heater water passage may be prevented from decreasing when the heat exchanging water flows into the heater water passage from the engine water passage after the engine water passage is connected to the heater water passage.

The engine water passage (16, 11W, 17, 18, 12W, 19) may include an engine inner water passage (11W) formed in the internal combustion engine (11). In this case, the engine circulation condition may include a condition that a third temperature of the heat exchanging water in the engine inner water passage (11W) is higher than or equal to a predetermined temperature.

The engine circulation condition may include a condition that a difference between a temperature of one portion of the internal combustion engine (11) and a temperature of another portion of the internal combustion engine (11) is larger than or equal to a predetermined temperature difference.

The engine circulation condition may include a condition that the internal combustion engine (11) operates.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features, and accompanied advantages of the present invention can be easily understood from the description of the embodiment of the present invention along with the drawings.

DESCRIPTION OF THE PREFERRED EMBODIMENTS

Figure 1:
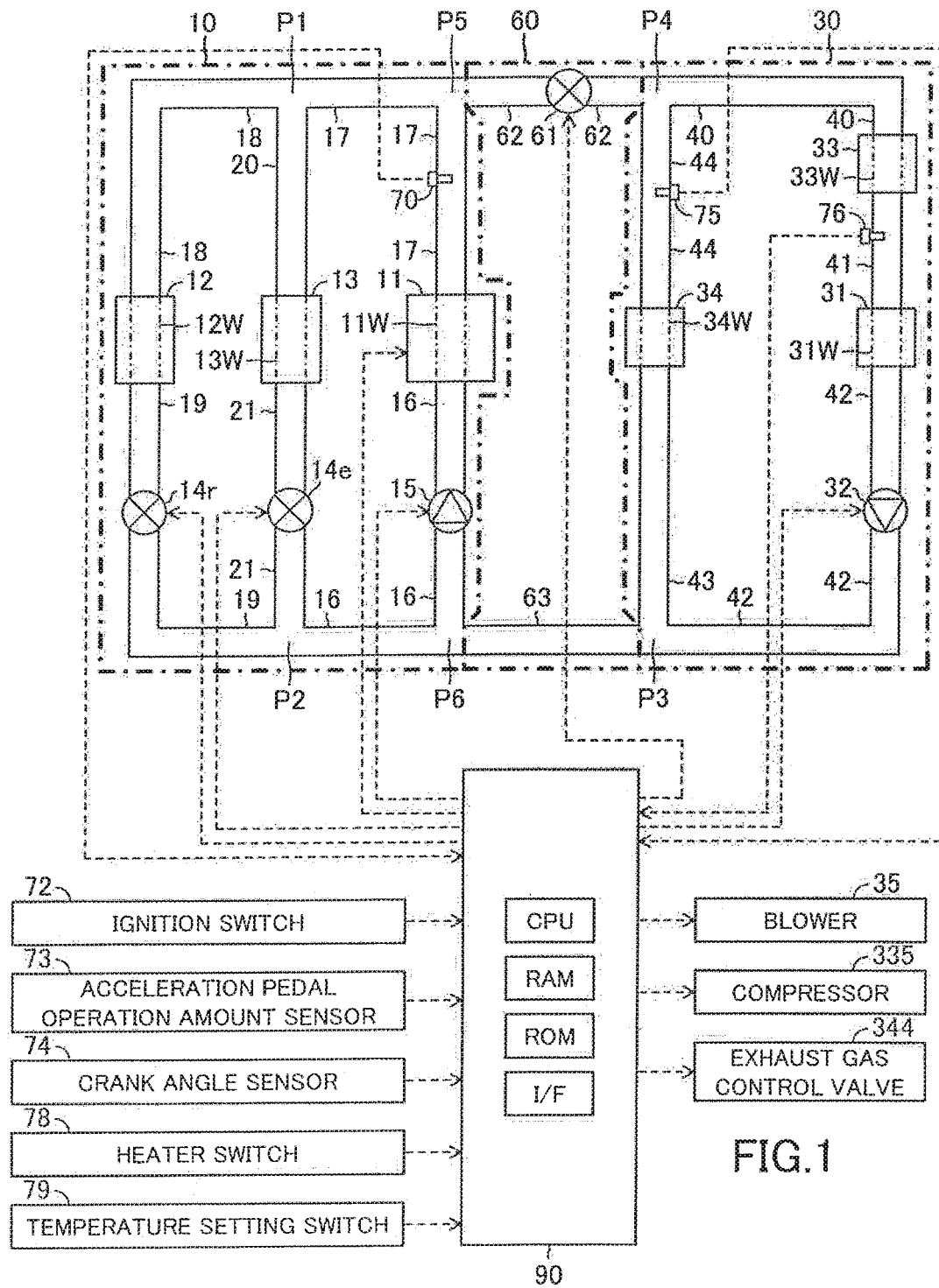
FIG. 1 is a view for showing a heat exchanging system, to which a control apparatus according to an embodiment of the invention is applied.

Below, a control apparatus of a heat exchanging system according to an embodiment of the invention, will be described with reference to the drawings. As shown in FIG. 1, the heat exchanging system, to which the control apparatus according to the embodiment of the invention is applied, includes an engine cooling system 10 and a heater core heating system 30. The cooling system 10 cools an internal combustion engine 11 by heat exchanging water. The heating system 30 heats a heater core 31 by the heat exchanging water. Hereinafter, the control apparatus according to the embodiment will be referred to as "the embodiment apparatus".

The cooling system 10 includes an engine water passage for circulating the heat exchanging water. The heating system 30 includes a heater water passage for circulating the heat exchanging water.

The heat exchanging system includes a connection system 60 for connecting the engine water passage of the cooling system 10 and the heater water passage of the heating system 30 to each other. Hereinafter, an operation for connecting the engine water passage of the cooling system 10 and the heater water passage of the heating system 30 to each other, will be referred to as "the system connection operation".

The cooling system 10 includes an engine inner water passage 11W, a radiator 12, an EGR cooler 13, a radiator flow rate control valve 14r, an EGR cooler flow rate control valve 14e, an engine water pump 15, an engine inflow water passage 16, an engine outflow water passage 17, a radiator inflow water passage 18, a radiator outflow water passage 19, an EGR cooler inflow water passage 20, and an EGR cooler outflow water passage 21. Hereinafter, the engine water pump 15 will be referred to as "the engine pump 15".

The engine inner water passage 11W is a water passage formed in a cylinder head (not shown) and a cylinder block (not shown) of the engine 11. The heat exchanging water flows through the engine inner water passage 11W as heat exchanging medium for exchanging heat with the cylinder head and the cylinder block. The heat exchanging water is generally liquid such as cooling water, radiator liquid, and coolant liquid.

When the heat exchanging water having a temperature lower than an engine temperature (i.e., a temperature of the engine 11), flows through the engine inner water passage 11W, the engine 11 is cooled by the heat exchanging water. On the other hand, when the heat exchanging water having a temperature higher than the engine temperature, flows through the engine inner water passage 11W, the engine 11 is heated or warmed by the heat exchanging water.

The radiator 12 includes tubes, fins and the like. The tubes define a water passage(s) 12W. The heat exchanging water flows through the water passage 12W. The fins are secured to the tubes. When the heat exchanging water having a temperature higher than a temperature of the fins of the radiator 12, flows through the water passage 12W, the heat exchanging water is cooled by the radiator 12. Hereinafter, the water passage 12W will be referred to as "the radiator inner water passage 12W".

The EGR cooler 13 includes tubes, fins and the like. The tubes define a water passage(s) 13W. The heat exchanging water flows through the water passage 13W. The fins are secured to the tubes. When the heat exchanging water having a temperature lower than a temperature of the fins of the EGR cooler 13, flows through the water passage 13W, the fins are cooled by the heat exchanging water. Hereinafter, the water passage 13W will be referred to as "the EGR cooler inner water passage 13W".

The EGR cooler 13 is a device for cooling an EGR gas. The EGR gas is an exhaust gas supplied to combustion chambers of the engine 11 by an exhaust gas recirculation system. The exhaust gas recirculation system supplies the exhaust gas by introducing, the exhaust gas discharged from the combustion chambers to an exhaust passage, to an intake passage.

The engine inflow water passage 16, the engine outflow water passage 17, the radiator inflow water passage 18, the radiator outflow water passage 19, the EGR cooler inflow water passage 20, and the EGR cooler outflow water passage 21 are water passages, through which the heat exchanging water flows, and defined by pipes, respectively.

The engine pump 15 is an electric water pump driven by electric power. The engine pump 15 is provided in the engine inflow water passage 16. A downstream end of the engine inflow water passage 16 is connected to an inlet of the engine inner water passage 11W. An outlet of the engine inner water passage 11W is connected to an upstream end of the engine outflow water passage 17.

A downstream end of the engine outflow water passage 17 is connected to an upstream end of the radiator inflow water passage 18 and an upstream end of the EGR cooler inflow water passage 20 at a connection portion P1. A downstream end of the radiator inflow water passage 18 is connected to an inlet of the radiator inner water passage 12W. An outlet of the radiator inner water passage 12W is connected to an upstream end of the radiator outflow water passage 19. A downstream end of the EGR cooler inflow water passage 20 is connected to an inlet of the EGR cooler inner water passage 13W. An outlet of the EGR cooler inner water passage 13W is connected to an upstream end of the EGR cooler outflow water passage 21. A downstream end of the radiator outflow water passage 19 and a downstream end of the EGR cooler outflow water passage 21 are connected to an upstream end of the engine inflow water passage 16 at a connection portion P2.

An engine water passage of the cooling system 10 is defined by the engine inner water passage 11W, the engine outflow water passage 17, the radiator inflow water passage 18, the radiator inner water passage 12W, the radiator outflow water passage 19, the EGR cooler inflow water passage 20, the EGR cooler inner water passage 13W, the EGR cooler outflow water passage 21, and the engine inflow water passage 16.

In this regard, the engine water passage of the cooling system 10 may be defined by the engine inner water passage 11W, the engine outflow water passage 17, the radiator inflow water passage 18, the radiator inner water passage 12W, the radiator outflow water passage 19, and the engine inflow water passage 16. Alternatively, the engine water passage of the cooling system 10 may be defined by the engine inner water passage 11W, the engine outflow water passage 17, the EGR cooler inflow water passage 20, the EGR cooler inner water passage 13W, the EGR cooler outflow water passage 21, and the engine inflow water passage 16.

The radiator flow rate control valve $14r$ is provided in the radiator outflow water passage 19. The radiator flow rate control valve $14r$ is a valve for controlling a flow rate of the heat exchanging water flowing through the radiator outflow water passage 19. As an opening degree of the radiator flow rate control valve $14r$ increases, the flow rate of the heat exchanging water passing through the radiator flow rate control valve $14r$ increases. Hereinafter, the radiator flow rate control valve $14r$ will be referred to as "the first control valve $14r$".

The EGR cooler flow rate control valve $14e$ is provided in the EGR cooler outflow water passage 21. The EGR cooler flow rate control valve $14e$ is a valve for controlling the flow rate of the heat exchanging water flowing through the EGR cooler outflow water passage 21. As an opening degree of the EGR cooler flow rate control valve $14e$ increases, the flow rate of the heat exchanging water passing through the EGR cooler flow rate control valve $14e$ increases. Hereinafter, the EGR cooler flow rate control valve $14e$ will be referred to as "the second control valve $14e$". It should be noted that the second control valve $14e$ may be omitted from the cooling system 10.

The heating system 30 includes a heater core 31, a heater water pump 32, a heat pump 33, an exhaust heat recovery device 34, a blower 35, a heat pump inflow water passage 40, a heater core inflow water passage 41, a heater core outflow water passage 42, a first exhaust heat recovery device water passage 43, a second exhaust heat recovery device water passage 44, a heater switch 78, and a temperature setting switch 79.

Hereinafter, the heater water pump 32 will be referred as "the heater pump 32", the first exhaust heat recovery device water passage 43 will be referred to as "the first EHR water passage 43", and the second exhaust heat recovery device water passage 44 will be referred to as "the second EHR water passage 44".

The heat pump inflow water passage 40, the core inflow water passage 41, the core outflow water passage 42, the first EHR water passage 43, and the second EHR water passage 44 are water passages, through which the heat exchanging water flows, and defined by pipes, respectively.

The heater core 31 includes tubes, fins and the like. The tubes define a water passage(s) 31W. The heat exchanging water flows through the water passage 31W. The fins are secured to the tubes. When the heat exchanging water having a temperature higher than a temperature of the fins of the heater core 31, flows through the water passage 31W, the fins are heated by the heat exchanging water. Therefore, the heater core 31 is heated by the heat exchanging water flowing through the water passage 31W. Hereinafter, the water passage 31W will be referred to as "the core inner water passage 31W".

Figure 2:
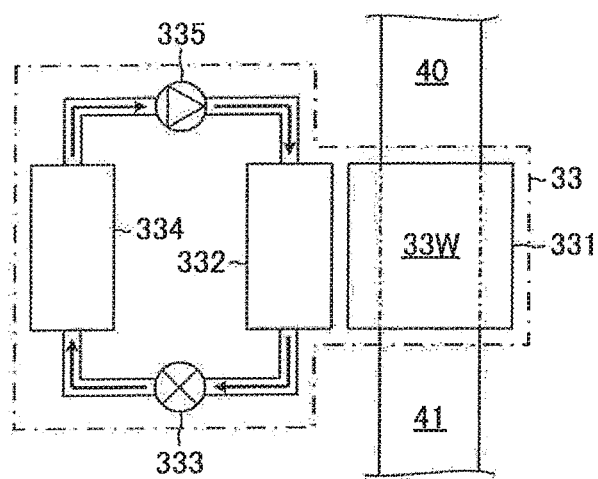
FIG. 2 is a view for showing a heat pump shown in FIG. 1.

As shown in FIG. 2, the heat pump 33 includes a heat exchanger 331, a condenser 332, an expansion valve 333, an evaporator 334, a compressor 335 and the like. The heat exchanger 331 includes a water passage(s) 33W, through which the heat exchanging water flows. Hereinafter, the water passage 33W will be referred to as "the heat pump inner water passage 33W".

When the compressor 335 is activated, heat exchanging medium is discharged from the compressor 335. The discharged heat exchanging medium flows through the compressor 335, the condenser 332, the expansion valve 333, and the evaporator 334 and then, is suctioned into the compressor 335. When the heat exchanging medium passes through the evaporator 334, the heat exchanging medium removes heat from outside of the evaporator 334, thereby evaporates. When the heat exchanging medium passes through the condenser 332, the heat exchanging medium discharges the heat, thereby condenses. A temperature of the heat exchanger 331 is increased by the heat discharged from the heat exchanging medium. Further, a temperature of the heat exchanging water flowing through the heat pump inner water passage 33W, is increased by the heat of the heat exchanger 331.

Therefore, the heat pump 33 is a heat exchanger for heating the heat exchanging water circulating through the heater water passage.

Figure 3:
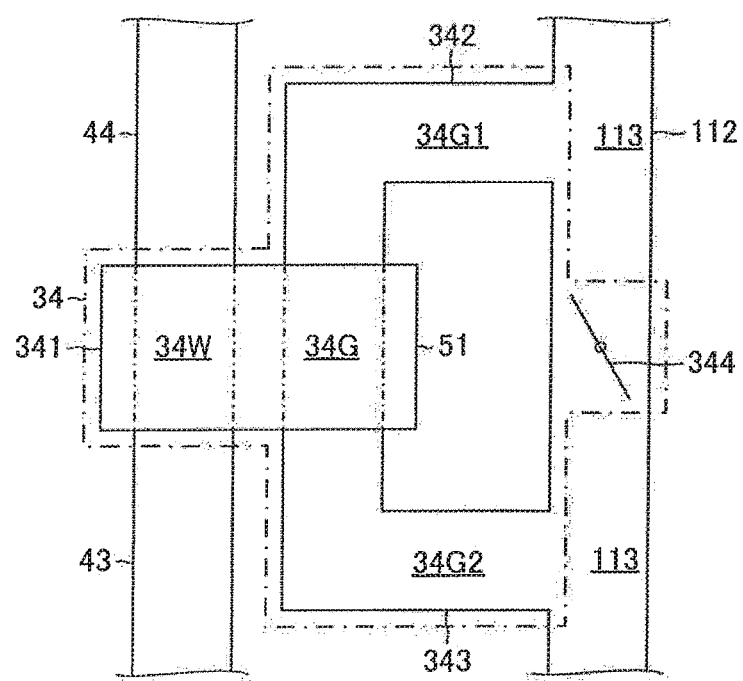
FIG. 3 is a view for showing an exhaust heat recovery device shown in FIG. 1

As shown in FIG. 3, the exhaust heat recovery device 34 includes a heat exchanger 341, an exhaust gas inflow pipe 342, an exhaust gas outflow pipe 343, an exhaust gas control valve 344, and the like.

The heat exchanger 341 includes a passage 34W and a passage 34G. The heat exchanging water flows through the passage 34W. The exhaust gas discharged from the combustion chambers of the engine 11, flows through the passage 34G. Hereinafter, the passage 34W will be referred to as "the EHR inner water passage 34W", and the passage 34G will be referred to as "the EHR exhaust gas passage 34G".

The exhaust gas control valve 344 is provided in an exhaust passage 113 defined by an exhaust pipe 112. The exhaust pipe 112 is secured to the engine 11 such that the exhaust passage 113 communicates with exhaust ports (not shown) of the engine 11.

The exhaust gas inflow pipe 342 defines an exhaust gas inflow passage 34G1. An upstream end of the exhaust gas inflow pipe 342 is connected to the exhaust pipe 112 at a position upstream of the exhaust gas control valve 344 such that the exhaust gas inflow passage 34G1 communicates with the exhaust passage 113. A downstream end of the exhaust gas inflow pipe 342 is secured to the heat exchanger 341 such that the exhaust gas inflow passage 34G1 communicates with an inlet of the EHR exhaust gas passage 34G.

The exhaust gas outflow pipe 343 defines an exhaust gas outflow passage 34G2. An upstream end of the exhaust gas outflow pipe 343 is secured to the heat exchanger 341 such that the exhaust gas outflow passage 34G2 communicates with an outlet of the EHR exhaust gas passage 34G. A downstream end of the exhaust gas outflow pipe 343 is connected to the exhaust pipe 112 at a position downstream of the exhaust gas control valve 344 such that the exhaust gas outflow passage 34G2 communicates with the exhaust passage 113.

When the exhaust gas control valve 344 is open, the exhaust gas passes through the exhaust gas control valve 344. In this case, almost of the exhaust gas passes through the exhaust gas control valve 344 and then, flows into the exhaust passage 113 downstream of the exhaust gas control valve 344. Therefore, almost no exhaust gas flows into the exhaust gas inflow passage 34G1.

On the other hand, when the exhaust gas control valve 344 is closed, the exhaust gas does not pass through the exhaust gas control valve 344. In this case, almost of the exhaust gas flows into the exhaust gas inflow passage 34G1. The exhaust gas flowing into the exhaust gas inflow passage 34G1, flows through the EHR exhaust gas passage 34G and the exhaust gas outflow passage 34G2 and then, flows into the exhaust passage 113 downstream of the exhaust gas control valve 344.

When the exhaust gas passes through the EHR exhaust gas passage 34G, the heat exchanger 341 is heated by the heat of the exhaust gas. The heat exchanging water flowing through the EHR inner water passage 34W, is heated by the heat of the heat exchanger 341.

Therefore, the exhaust heat recovery device 34 is a heat exchanger for heating the heat exchanging water circulating through the heater water passage.

The heater pump 32 is an electric water pump driven by the electric power and is provided in the heater core outflow water passage 42. A downstream end of the heater core outflow water passage 42 is connected to an end of the first EHR water passage 43 at a connection portion P3. The other end of the first EHR water passage 43 is connected to an end of the EHR inner water passage 34W. The other end of the EHR inner water passage 34W is connected to an end of the second EHR water passage 44. The other end of the second EHR water passage 44 is connected to an upstream end of the heat pump inflow water passage 40 at a connection portion P4. A downstream end of the heat pump inflow water passage 40 is connected to an inlet of the heat pump inner water passage 33W. An outlet of the heat pump inner water passage 33W is connected to an upstream end of the core inflow water passage 41. A downstream end of the heater core inflow water passage 41 is connected to an inlet of the core inner water passage 31W. An outlet of the core inner water passage 31W is connected to an upstream end of the heater core outflow water passage 42.

The heater water passage of the heater core heating system 30 is formed by the core inner water passage 31W, the heater core outflow water passage 42, the first EHR water passage 43, the EHR inner water passage 34W, the second EHR water passage 44, the heat pump inflow water passage 40, the heat pump inner water passage 33W, and the heater core inflow water passage 41.

The connection system 60 includes a connection valve 61, a connection inflow water passage 62, and a connection outflow water passage 63. The connection inflow water passage 62 connects a portion P5 of the engine outflow water passage 17 to the connection portion P4, at which the second EHR water passage 44 and the heat pump inflow water passage 40 are connected to each other. The connection outflow water passage 63 connects a portion P6 of the engine inflow water passage 16 to the connection portion P3, at which the heater core outflow water passage 42 and the first EHR water passage 43 are connected to each other.

The connection valve 61 is provided in the connection inflow water passage 62. When the connection valve 61 is open, the heat exchanging water may pass through the connection valve 61. On the other hand, when the connection valve 61 is closed, the heat exchanging water may not pass through the connection valve 61.

The embodiment apparatus includes an ECU 90. The ECU 90 is an electronic control unit. In particular, the ECU 90 is an electronic control circuit including as a main component a microcomputer including a CPU, a ROM, a RAM, an interface and the like. The CPU realizes various functions described later by executing instructions or routines stored in a memory such as the ROM.

The ECU 90 is electrically connected to the engine pump 15, the first control valve 14r, the second control valve 14e, a water temperature sensor 70, an ignition switch 72, an acceleration pedal operation amount sensor 73, and a crank angle sensor 74. Activations of the engine pump 15, the first control valve 14r, and the second control valve 14e are controlled by the ECU 90 as described later.

The water temperature sensor 70 is provided in the engine outflow water passage 17 upstream of the connection portion P5, at which the engine outflow water passage 17 and the connection inflow water passage 62 are connected to each other. The water temperature sensor 70 detects a temperature TWeng of the heat exchanging water flowing through the engine outflow water passage 17 upstream of the connection portion P5 and sends a signal representing the temperature TWeng to the ECU 90. The ECU 90 acquires the temperature TWeng on the basis of the signal. Hereinafter, the temperature TWeng will be referred to as "the engine water temperature TWeng".

The ignition switch 72 is operated by a driver of a vehicle, on which the engine 11 is mounted. When the ignition switch 72 is set to an ON position, the ignition switch 72 sends a high signal to the ECU 90. On the other hand, when the ignition switch 72 is set to an OFF position, the ignition switch 72 sends a low signal to the ECU 90. When the ECU 90 receives the high signal, the ECU 90 causes an engine operation (i.e., an operation of the engine 11) to start. On the other hand, when the ECU 90 receives the low signal, the ECU 90 causes the engine operation to stop.

The acceleration pedal operation amount sensor 73 detects an operation amount AP of an acceleration pedal (not shown) and sends a signal representing the operation amount AP to the ECU 90. The ECU 90 acquires an engine load KL (i.e., a load of the engine 11) on the basis of the signal.

The crank angle sensor 74 sends a pulse signal to the ECU 90 every a crank shaft (not shown) rotates by a predetermined angle. The ECU 90 acquires an engine speed NE (i.e., a rotation speed of the engine 11) on the basis of the pulse signal, etc.

Further, the ECU 90 is electrically connected to the heater pump 32, the compressor 335 of the heat pump 33, the exhaust gas control valve 344 of the exhaust heat recovery device 34, the blower 35, the connection valve 61, a water temperature sensor 75, a water temperature sensor 76, the heater switch 78, and the temperature setting switch 79. Activations of the heater pump 32, the compressor 335 of the heat pump 33, the exhaust gas control valve 344 of the exhaust heat recovery device 34, the blower 35, and the connection valve 61 are controlled by the ECU 90 as described later.

The blower 35 is a device for blowing air toward the heater core 31, thereby heating the air by the heat of the heater core 31. The air heated by the heat of the heater core 31, is supplied to an interior of the vehicle.

The water temperature sensor 75 is provided in the second EHR water passage 44. The water temperature sensor 75 detects a temperature TWehr of the heat exchanging water flowing through the second EHR water passage 44 from the exhaust heat recovery device 34 and sends a signal representing the temperature TWehr to the ECU 90. The ECU 90 acquires the temperature TWehr on the basis of the signal. Hereinafter, the temperature TWehr will be referred to as "the EHR water temperature TWehr".

The water temperature sensor 76 is provided in the core inflow water passage 41. The water temperature sensor 76 detects a temperature TWhc of the heat exchanging water flowing into the heater core 31 from the heat pump 33 and sends a signal representing the temperature TWhc to the ECU 90. The ECU 90 acquires the temperature TWhc on the basis of the signal. Hereinafter, the temperature TWhc will be referred to as "the core water temperature TWhc".

The heater switch 78 is operated by the driver of the vehicle, on which the engine 11 is mounted. When the heater switch 78 is set to an ON position, the heater switch 78 sends a high signal to the ECU 90. On the other hand, when the heater switch 78 is set to an OFF position, the heater switch 78 sends a low signal to the ECU 90. When the ECU 90 receives the high signal, the ECU 90 determines that the heater switch 78 is set to the ON position. On the other hand, when the ECU 90 receives the low signal, the ECU 90 determines that the heater switch 78 is set to the OFF position.

The temperature setting switch 79 is a switch operated by the driver for setting a temperature of the interior of the vehicle which the driver desires. The temperature setting switch 79 sends a signal representing a temperature Tset of the interior of the vehicle set by the driver, to the ECU 90. The ECU 90 acquires the temperature Tset on the basis of the signal. Hereinafter, the temperature Tset will be referred to as "the vehicle interior set temperature Tset".

Further, the ECU 90 acquires a target of the core water temperature TWhc necessary for accomplishing the vehicle interior set temperature Tset. The ECU 90 sets the target of the core water temperature TWhc as a target core water temperature TWhc_tgt. The target core water temperature TWhc_tgt increases as the vehicle interior set temperature Tset increases. Further, the ECU 90 acquires a difference $\Delta$TWhc of the core water temperature TWhc relative to the target core water temperature TWhc_tgt ($\Delta$TWhc=TWhc_tgt−TWhc). Hereinafter, the difference $\Delta$TWhc will be referred to as "the core water temperature difference $\Delta$TWhc".

Figure 4:
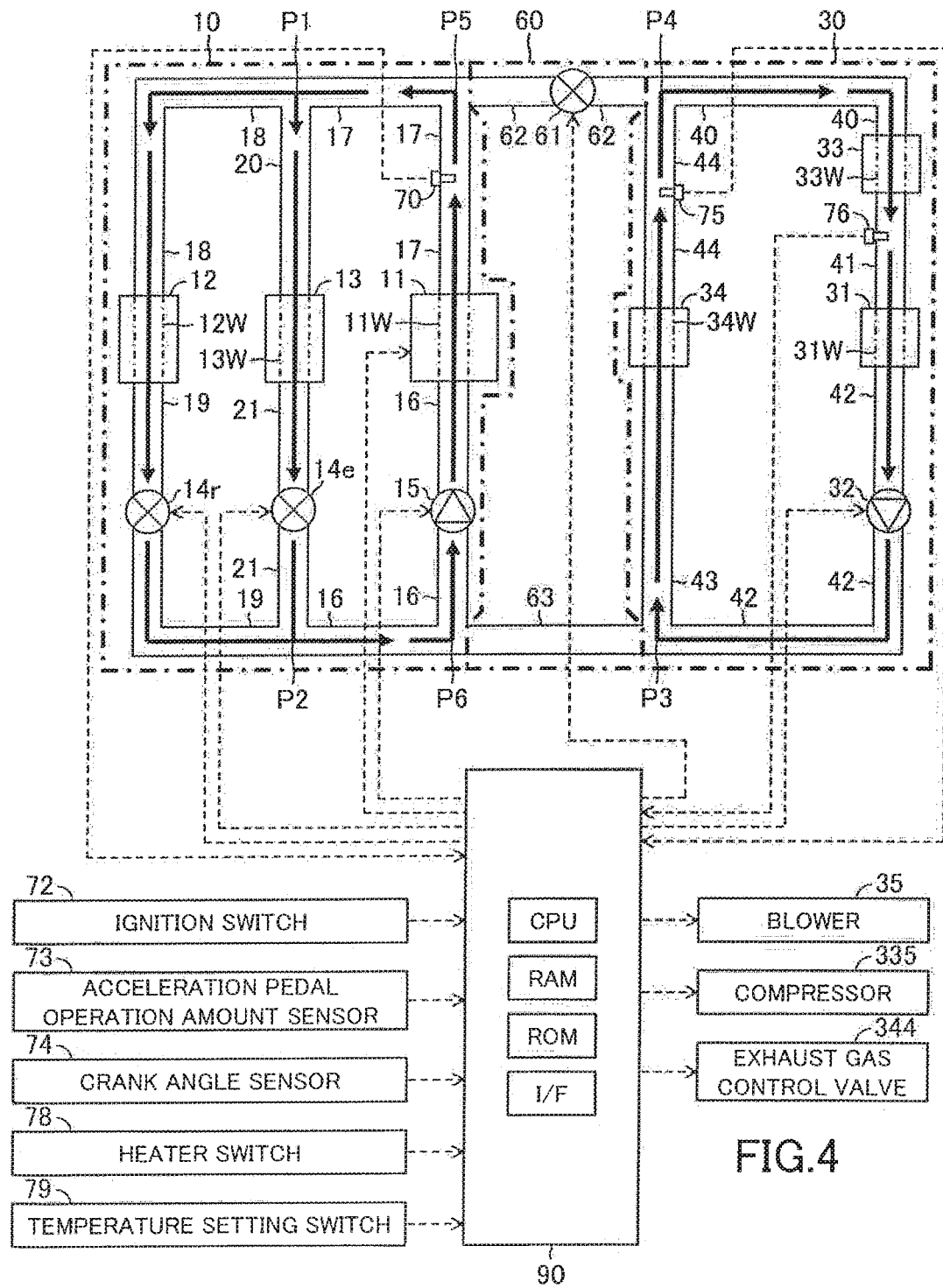
FIG. 4 is a view similar to FIG. 1 and which shows a flow of heat exchanging water.

When the connection valve 61 is closed (that is, the system connection operation is not performed), the first control valve 14r is open, and the second control valve 14e is open while the engine pump 15 and the heater pump 32 are activated, the heat exchanging water flows as shown in FIG. 4.

In particular, the heat exchanging water discharged from the engine pump 15, flows through the engine inflow water passage 16 and the engine inner water passage 11W and then, flows into the engine outflow water passage 17. A part of the heat exchanging water flowing into the engine outflow water passage 17, flows through the radiator inflow water passage 18, the radiator inner water passage 12W, the radiator outflow water passage 19, and the engine inflow water passage 16 and then, is suctioned into the engine pump 15.

On the other hand, the remaining of the heat exchanging water flowing into the engine outflow water passage 17, flows through the EGR cooler inflow water passage 20, the EGR cooler inner water passage 13W, the EGR cooler outflow water passage 21, and the engine inflow water passage 16 and then, is suctioned into the engine pump 15.

The heat exchanging water discharged from the heater pump 32, flows through the heater core outflow water passage 42, the first EHR water passage 43, the EHR inner water passage 34W, the second EHR water passage 44, the heat pump inflow water passage 40, the heat pump inner water passage 33W, the core inflow water passage 41, the core inner water passage 31W, and the core outflow water passage 42 and then, is suctioned into the heater pump 32.

Figure 5:
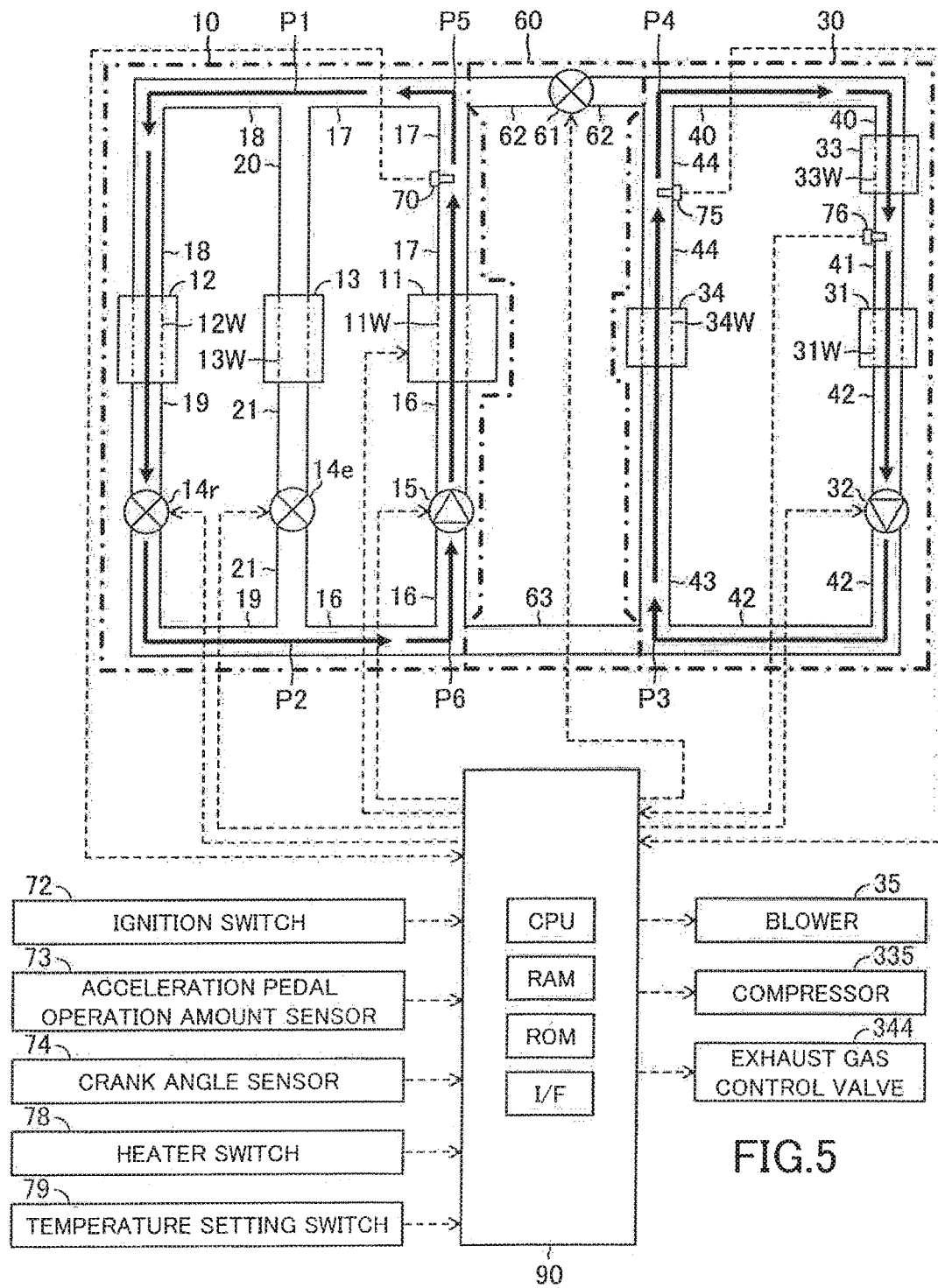
FIG. 5 is a view similar to FIG. 1 and which shows the flow of the heat exchanging water.

When the connection valve 61 is closed (that is, the system connection operation is not performed), the first control valve 14r is open, and the second control valve 14e is closed while the engine pump 15 and the heater pump 32 are activated, the heat exchanging water flows as shown in FIG. 5.

In this case, the flow of the heat exchanging water in the cooling system 10 and the heating system 30 is the same as the flow of the heat exchanging water described with reference to FIG. 4, except that the heat exchanging water discharged from the engine pump 15, does not flow through the EGR cooler inflow water passage 20, the EGR cooler inner water passage 13W, and the EGR cooler outflow water passage 21.

Figure 6:
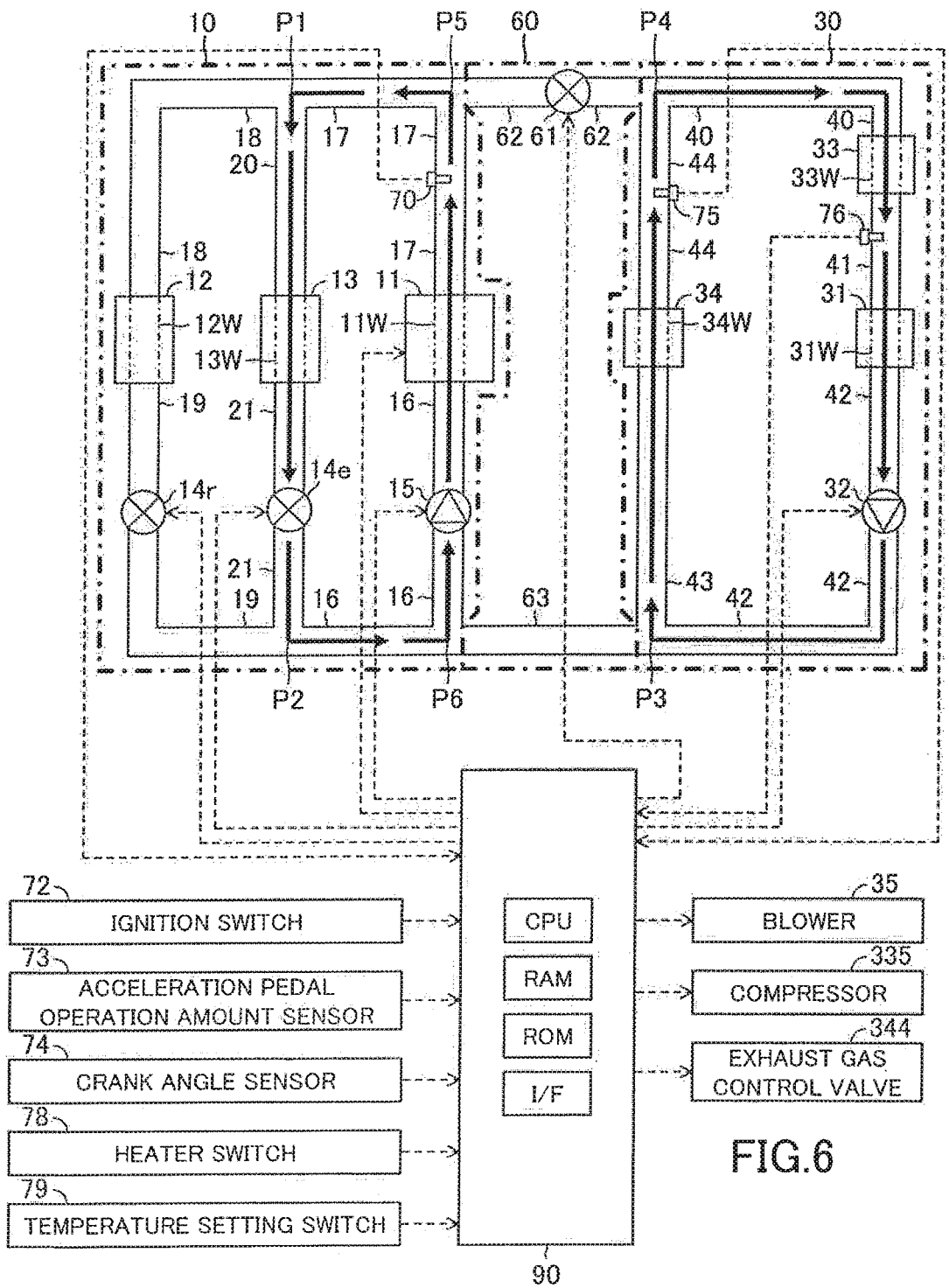
FIG. 6 is a view similar to FIG. 1 and which shows the flow of the heat exchanging water.

When the connection valve 61 is closed (that is, the system connection operation is not performed), the first control valve 14r is closed, and the second control valve 14e is open while the engine pump 15 and the heater pump 32 are activated, the heat exchanging water flows as shown in FIG. 6.

In this case, the flow of the heat exchanging water in the cooling system 10 and the heating system 30 is the same as the flow of the heat exchanging water described with reference to FIG. 4, except that the heat exchanging water discharged from the engine pump 15, does not flow through the radiator inflow water passage 18, the radiator inner water passage 12W, and the radiator outflow water passage 19.

The flow of the heat exchanging water described with reference to FIG. 4, FIG. 5, and FIG. 6 is the flow of the heat exchanging water when the engine pump 15 and the heater pump 32 are activated. However, in this embodiment, only one of the engine pump 15 and the heater pump 32 may be activated.

When the heater pump 32 is not activated, and the engine pump 15 is activated, the heat exchanging water does not circulate through the heater water passage, and the heat exchanging water circulates through the engine water passage. On the other hand, when the engine pump 15 is riot activated, and the heater pump 32 is activated, the heat exchanging water does not circulate through the engine water passage, and the heat exchanging water circulates through the heater water passage.

Figure 7:
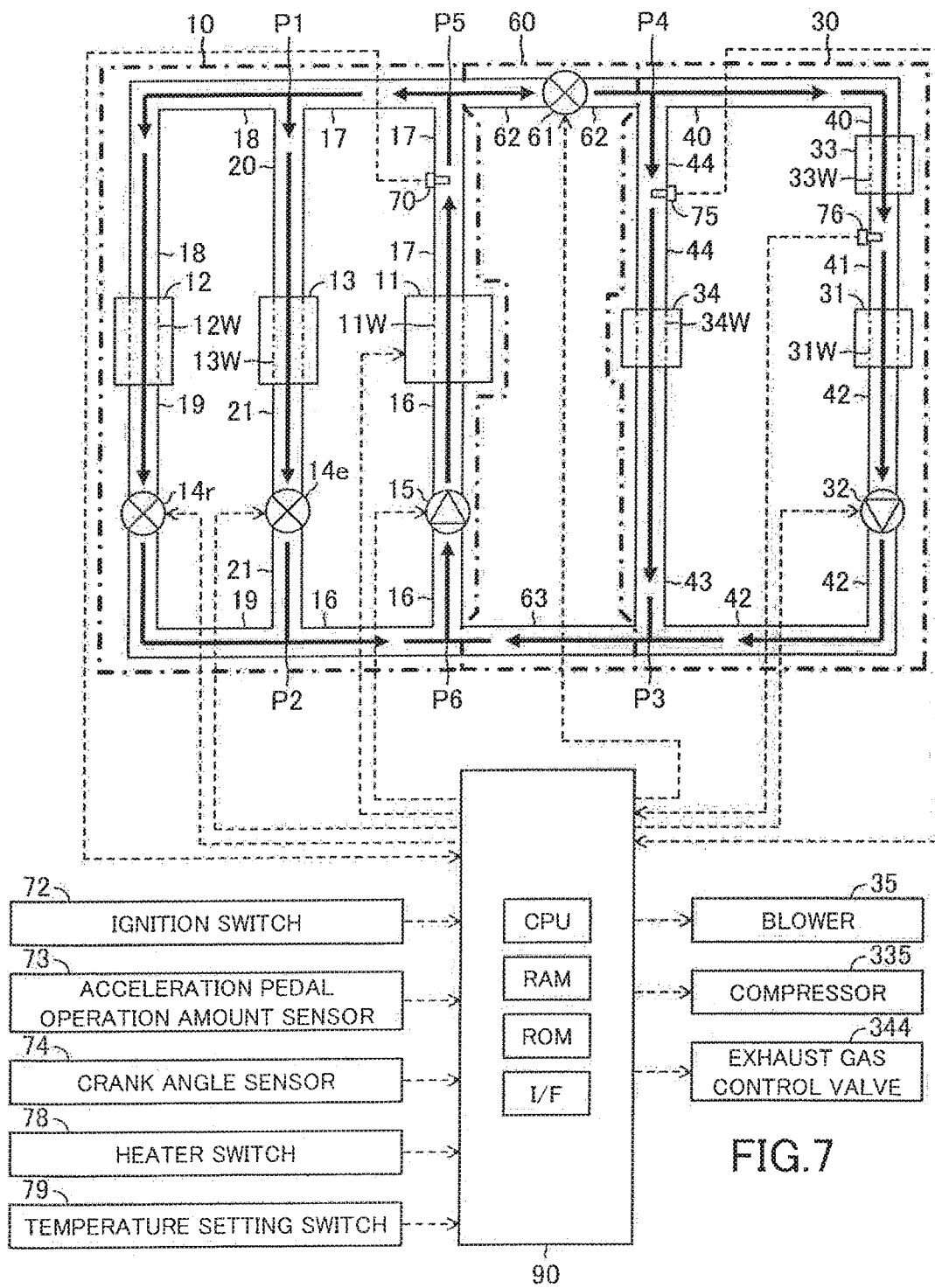
FIG. 7 is a view similar to FIG. 1 and which shows the flow of the heat exchanging water.

When the connection valve 61 is open (that is, the system connection operation is performed), the first control valve 14r is open, and the second control valve 14e is open while the engine pump 15 and the heater pump 32 are activated, the heat exchanging water flows as shown in FIG. 7.

in particular, the heat exchanging water discharged from the engine pump 15, flows into the engine inner water passage 11W. A part of the heat exchanging water flowing into the engine outflow water passage 17 through the engine inner water passage 11W, flows through the engine outflow water passage 17 and then, flows into the radiator inflow water passage 18 and the EGR cooler inflow water passage 20. The heat exchanging water flowing into the radiator inflow water passage 18, flows through the radiator inner water passage 12W and the radiator outflow water passage 19, and then, flows into the engine inflow water passage 16. The heat exchanging water flowing into the engine inflow water passage 16, is suctioned into the engine pump 15. The heat exchanging water flowing into the EGR cooler inflow water passage 20, flows through the EGR cooler inner water passage 13W, the EGR cooler outflow water passage 21, and the engine inflow water passage 16 and then, is suctioned into the engine pump 15.

On the other hand, the remaining of the heat exchanging water flowing into the engine outflow water passage 17 through the engine inner water passage 11W, flows into the heat pump inflow water passage 40 and the second EHR water passage 44 through the connection inflow water passage 62. The heat exchanging water flowing into the heat pump inflow water passage 40, flows through the heat pump inner water passage 33W, the core inflow water passage 41, and the core inner water passage 31W and then, is suctioned into the heater pump 32. The heat exchanging water flowing into the second EHR water passage 44, flows through the EHR inner water passage 34W, the connection outflow water passage 63, and the engine inflow water passage 16 and then, is suctioned into the engine pump 15.

Further, the heat exchanging water discharged from the heater pump 32, flows through the heater core outflow water passage 42, the connection outflow water passage 63, and the engine inflow water passage 16 and then, is suctioned into the engine pump 15.

Figure 8:
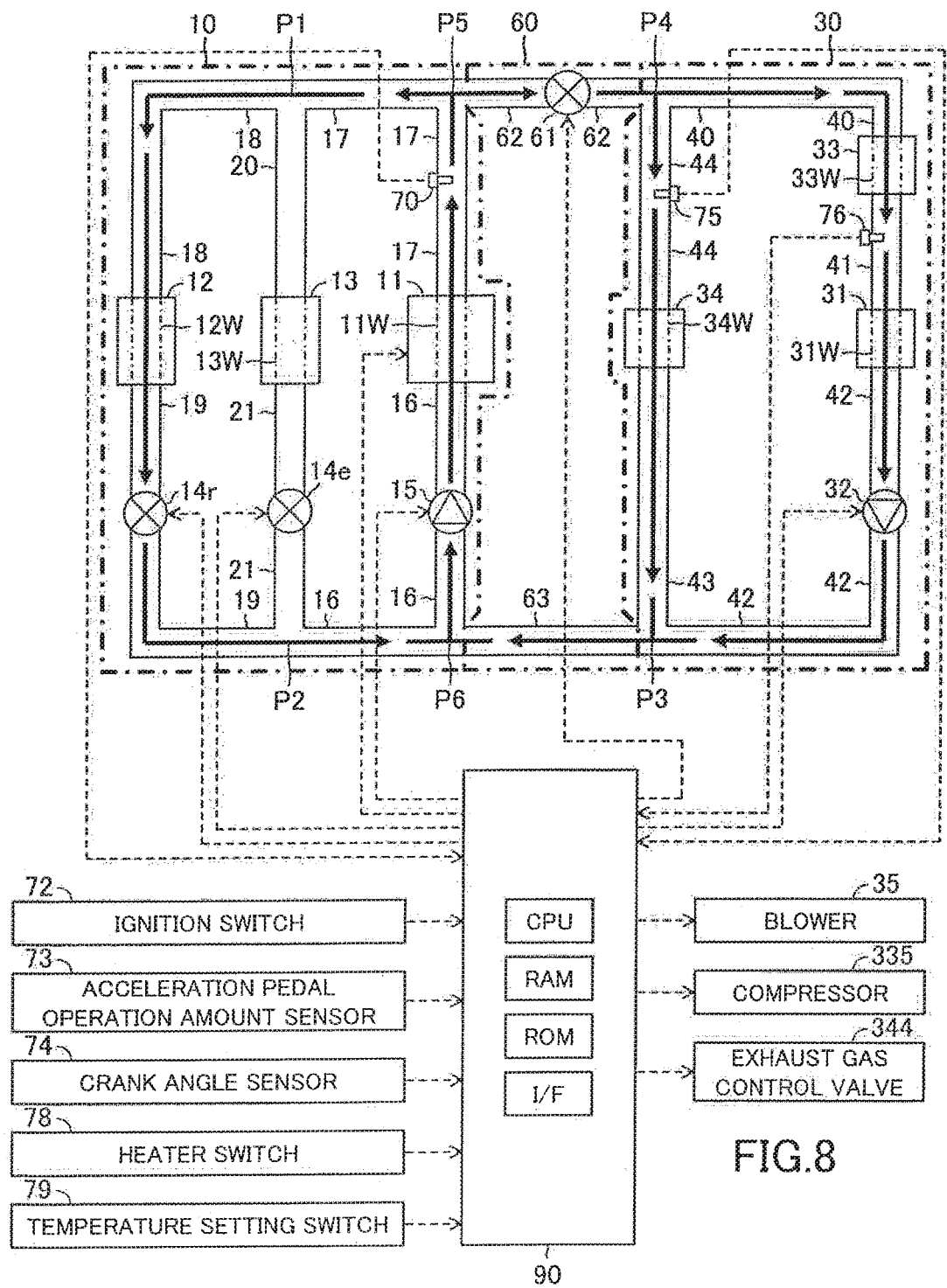
FIG. 8 is a view similar to FIG. 1 and which shows the flow of the heat exchanging water.

When the connection valve 61 is open (that is, the system connection operation is performed), the first control valve 14r is open, and the second control valve 14e is closed while the engine pump 15 and the heater pump 32 are activated, the heat exchanging water flows as shown in FIG. 8.

In this case, the flow of the heat exchanging water in the cooling system 10 and the heating system 30 is the same as the flow of the heat exchanging water described with reference to FIG. 7, except that the heat exchanging water discharged from the engine pump 15, does not flow through the EGR cooler inflow water passage 20, the EGR cooler inner water passage 13W, and the EGR cooler outflow water passage 21.

Figure 9:
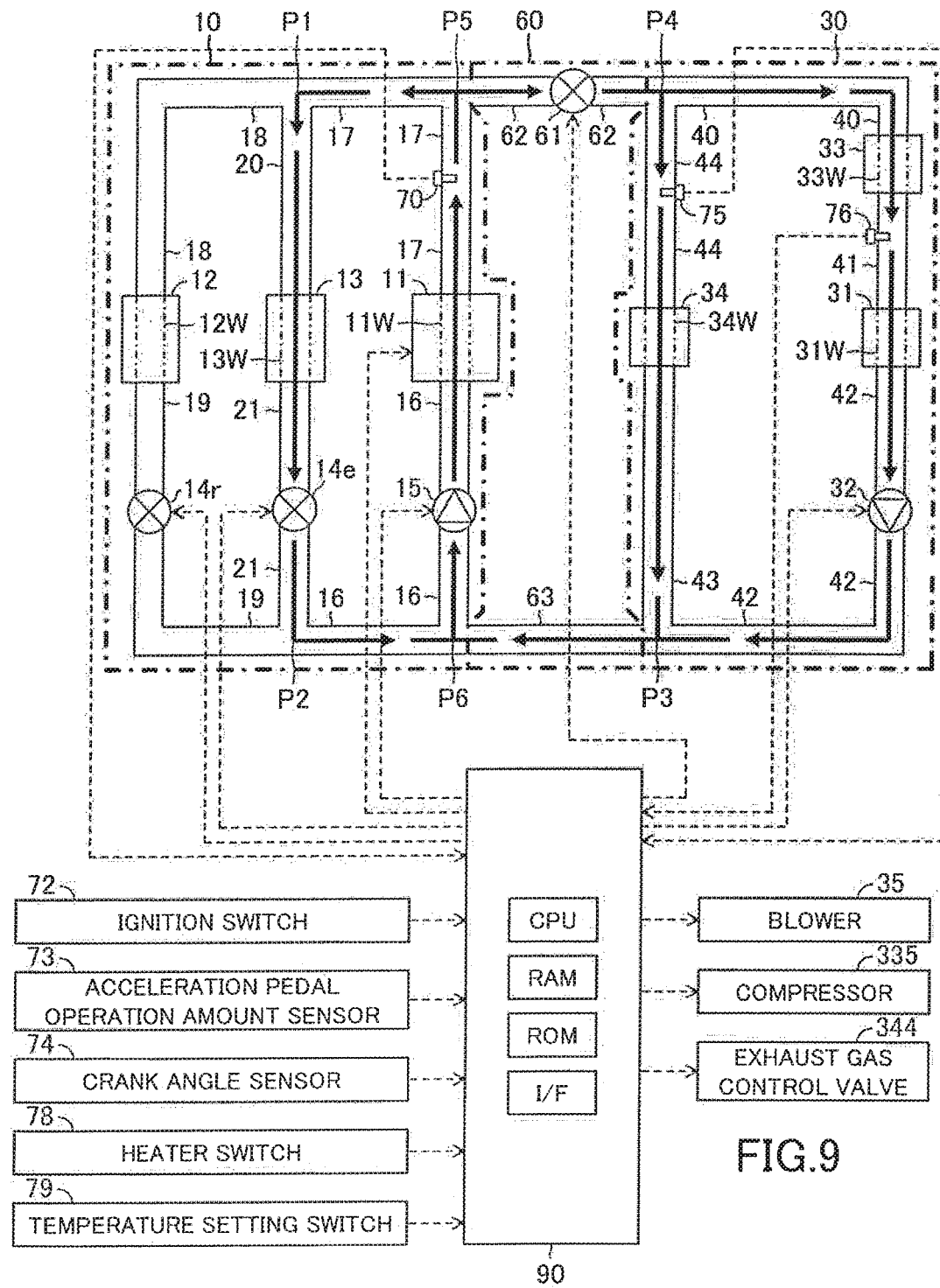
FIG. 9 is a view similar to FIG. 1 and which shows the flow of the heat exchanging water.

When the connection valve 61 is open (that is, the system connection operation is performed), the first control valve 14r is closed, and the second control valve 14e is open while the engine pump 15 and the heater pump 32 are activated, the heat exchanging water flows as shown in FIG. 9.

In this case, the flow of the heat exchanging water in the cooling system 10 and the heating system 30 is the same as the flow of the heat exchanging water described with reference to FIG. 7, except that the heat exchanging water discharged from the engine pump 15 does not flow through the radiator inflow water passage 18, the radiator inner water passage 12W, and the radiator outflow water passage 19.

Figure 10:
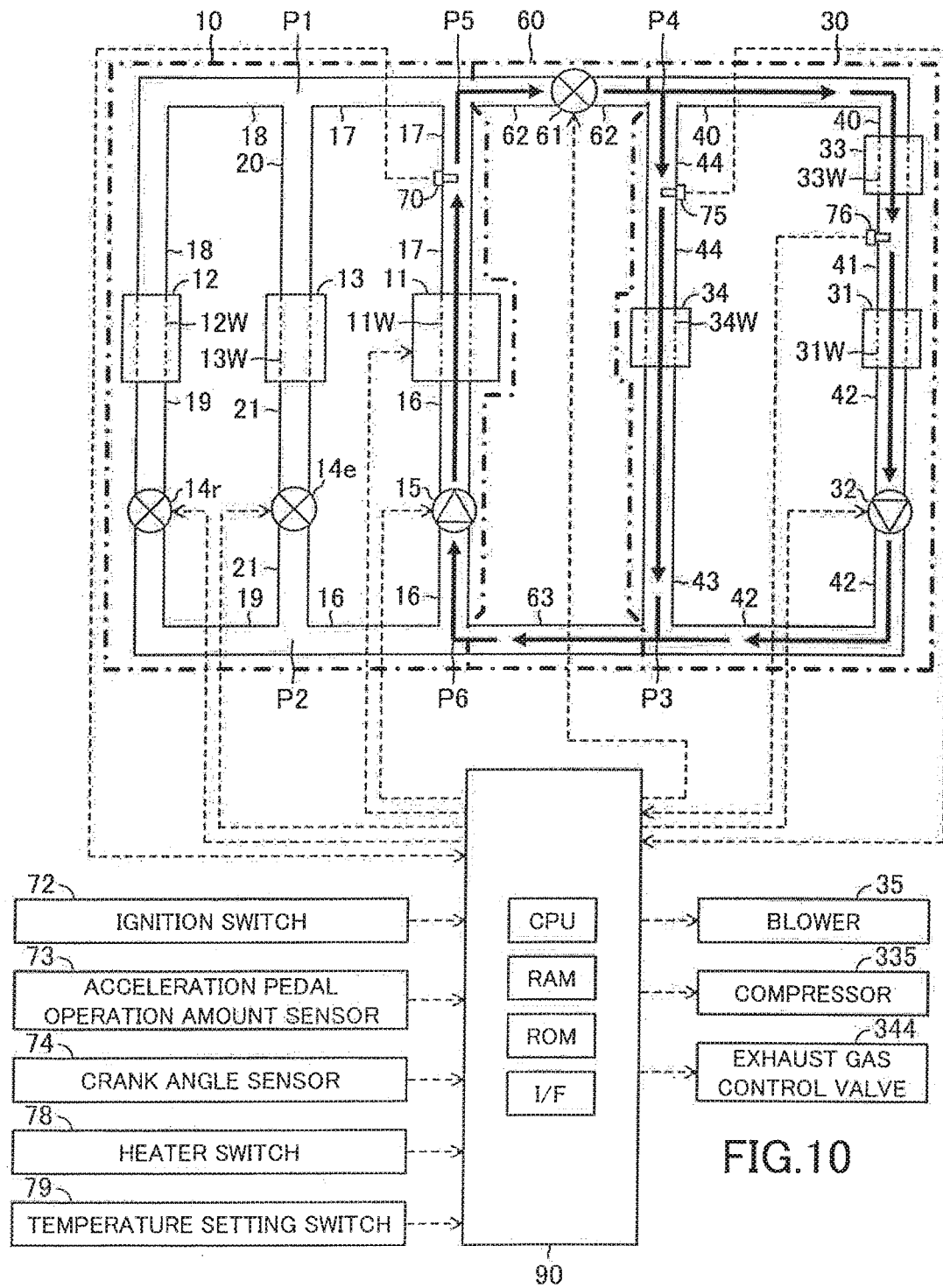
FIG. 10 is a view similar to FIG. 1 and which shows the flow of the heat exchanging water.

When the first control valve 14r and the second control valve 14e are closed while the heat exchanging water flows as shown in FIG. 7, the heat exchanging water flows as shown in FIG. 10. In this case, the flow of the heat exchanging water in the cooling system 10 and the heating system 30 is the same as the flow of the heat exchanging water described with reference to FIG. 7, except that the heat exchanging water discharged from the engine pump 15 does not flow through the EGR cooler inflow water passage 20, the EGR cooler inner water passage 13W, and the EGR cooler outflow water passage 21 and through the radiator inflow water passage 18, the radiator inner water passage 12W, and the radiator outflow water passage 19.

Also, when the first control valve 14r is closed while the heat exchanging water flows as shown in FIG. 8, the heat exchanging water flows as shown in FIG. 10. When the second control valve 14e is closed while the heat exchanging water flows as shown in FIG. 9, the heat exchanging water flows as shown in FIG. 10.

<Summary of Operation of Embodiment Apparatus>

Next, a summary of an operation of the embodiment apparatus will be described. The embodiment apparatus cools the engine 11 by activating the engine pump 15 to supply the heat exchanging water to the engine inner water passage 11W when an engine circulation condition that a circulation of the heat exchanging water in the engine water passage is requested, is satisfied.

In this embodiment, the engine circulation condition is satisfied when a temperature TWeng1 of the heat exchanging water in the engine inner water passage 11W is equal to or higher than a predetermined water temperature TWeng1_th while the activation of the engine pump 15 is stopped after the ignition switch 72 is set to the ON position and the engine operation starts. Hereinafter, the temperature TWeng1 will be referred to as "the engine inner water temperature TWeng1".

When the engine inner water temperature TWeng1 increases excessively, the heat exchanging water may boil in the engine inner water passage 11W. In this regard, the embodiment apparatus is configured such that the engine circulation condition is satisfied in response to the engine inner water temperature TWeng1 becoming equal to or higher than the predetermined water temperature TWeng1_th. Therefore, the engine pump 15 is activated, thereby decreasing the temperature of the heat exchanging water in the engine inner water passage 11W when the engine inner water temperature TWeng1 becomes equal to or higher than the predetermined water temperature TWeng1_th. Thereby, the engine inner water temperature TWeng1 may be prevented from increasing excessively. As a result, the heat exchanging water may be prevented from boiling in the engine inner water passage 11W.

The predetermined water temperature TWeng1_th is set to an upper limit of a sufficiently low temperature of the heat exchanging water capable of preventing the heat exchanging water from boiling in the engine inner water passage 11W while the activation of the engine pump 15 is stopped.

The engine inner water temperature TWeng1 may be estimated on the basis of the temperature TWeng detected by the water temperature sensor 70 after the engine operation starts. Alternatively, the engine inner water temperature TWeng1 may be estimated on the basis of a combination of parameters such as the temperature TWeng detected by the water temperature sensor 70 at a time of the engine operation starting, a time elapsing from the time of the engine operation starting, a history of the engine operation after the engine operation starts (in particular, a total amount of fuel supplied to the engine 11 after the engine operation starts), and the like.

Alternatively, the temperature detected by another water temperature sensor for detecting the engine inner water temperature TWeng1 provided in the engine 11, may be used as the engine inner water temperature TWeng1.

In this regard, when between-bores water passages for the heat exchanging water are formed between adjacent cylinder bores defining combustion chambers of the engine 11, another water temperature sensor is preferably provided for detecting a temperature of the heat exchanging water in the between-bores water passage. The between-bores water passages are so-called drilled paths and are formed to branch from a cylinder head water passage formed in a cylinder head of the engine 11 to between the adjacent cylinder bores.

Alternatively, a water temperature sensor for detecting a temperature of the heat exchanging water in a water passage for cooling an exhaust manifold of the engine 11, is preferably provided in the engine 11.

Further, in this embodiment, the engine circulation condition is satisfied when a temperature difference $\Delta$Teng between temperatures of optional two portions of the engine 11 is equal to or larger than a predetermined temperature difference $\Delta$Teng_th while the activation of the engine pump 15 is stopped after the engine operation starts. Hereinafter, the temperature difference $\Delta$Teng between the temperatures of the optional two portions of the engine 11, will be referred to as "the engine inner temperature difference $\Delta$Teng".

When an excessively large temperature difference is produced in the engine 11, a strain may be produced in the engine 11. In this regard, the embodiment apparatus is configured such that the engine circulation condition is satisfied in response to the engine inner temperature difference $\Delta$TWeng becoming equal to or larger than the predetermined temperature difference $\Delta$TWeng_th. Therefore, the engine pump 15 is activated, thereby decreasing the engine inner temperature difference $\Delta$TWeng when the engine inner temperature difference $\Delta$TWeng becomes equal to or larger than the predetermined temperature difference $\Delta$TWeng_th. Thereby, the excessively large temperature difference may be prevented from being generated in the engine 11. As a result, the strain may be prevented from be generated in the engine 11.

The predetermined temperature difference $\Delta$TWeng_th is set to an upper limit of a sufficiently small temperature difference capable of maintaining the strain produced in the engine 11 in a permitted range while the activation of the engine pump 15 is stopped.

Further, the engine inner temperature difference $\Delta$Teng is estimated on the basis of a combination of parameters such as the temperature TWeng detected by the water temperature sensor 70 at the time of the engine operation starting, the time elapsing from the time of the engine operation starting, the history of the engine operation after the engine operation starts (in particular, the total amount of the fuel supplied to the engine 11 after the engine operation starts), and the like.

Alternatively, a difference between the engine inner water temperatures TWeng1 detected by water temperature sensors for detecting the engine inner water temperatures TWeng1, respectively provided in at least two portions of the engine inner water passage 11W, may be used as the engine inner temperature difference $\Delta$Teng.

In this regard, there are preferably provided in the engine 11, a water temperature sensor for detecting the temperature of the heat exchanging water for cooling upper areas of the cylinder bores (i.e., cylinder liners) defining the combustion chambers of the engine 11 and a water temperature sensor for detecting the temperature of the heat exchanging water for cooling lower areas of the cylinder bores (i.e., the cylinder liners).

The embodiment apparatus may be configured to determine that the engine circulation condition is satisfied when the engine operation starts. Alternatively, the embodiment apparatus may be configured to determine that the engine circulation condition is satisfied when the temperature of the engine 11 reaches or is estimated to reach a predetermined temperature after the engine operation starts.

Further, the embodiment apparatus warms the interior of the vehicle by activating the heater pump 32 to supply the heat exchanging water to the core inner water passage 31W, thereby heating the heater core 31, and activating the blower 35 when a warming condition that the heater switch 78 is set to the ON position, is satisfied.

When the engine water temperature TWeng is higher than the core water temperature TWhc, the heater core 31 may be heated, using the heat of the engine 11 by performing the system connection operation to supply the heat exchanging water flowing in the cooling system 10, to the heating system 30.

Accordingly, the embodiment apparatus opens the connection valve 61 to perform the system connection operation, thereby supplying the heat exchanging water flowing in the cooling system 10, to the heating system 30 when the engine circulation condition is satisfied, the warming condition is satisfied, and the engine water temperature TWeng is higher than the core water temperature TWhc. Hereinafter, a condition that the engine circulation condition is satisfied, the warming condition is satisfied, and the engine water temperature TWeng is higher than the core water temperature TWhc, will be referred to as "the connection condition". On the other hand, when the connection condition is not satisfied, the embodiment apparatus closes the connection valve 61 to stop the system connection operation, thereby stopping supply of the heat exchanging water to the heating system 30 from the cooling system 10.

When the connection valve 61 opens, that is, the system connection operation is performed while the heat exchanging water flows as shown in FIG. 4, a part of the heat exchanging water flowing through the engine cooling system 10 flows into the connection inflow water passage 62 from the connection portion P5. The heat exchanging water flows through the connection inflow water passage 62 and flows into the heat pump inflow water passage 40 from the connection portion P4. In the heat exchanging system according to this embodiment, the pressure of the heat exchanging water flowing into the heat pump inflow water passage 40 from the connection inflow water passage 62 is higher than the pressure of the heat exchanging water flowing into the heat pump inflow water passage 40 from the second EHR water passage 44.

Therefore, after the heat exchanging water starts to flow into the heat pump inflow water passage 40 from the connection inflow water passage 62, the amount of the heat exchanging water flowing into the heat pump inflow water passage 40 from the second EHR water passage 44 decreases gradually. Then, a part of the heat exchanging water flowing into the connection portion P4 from the connection inflow water passage 62 starts to flow into the second EHR water passage 44. Thus, the heat exchanging water flows toward the connection portion P3 from the connection portion P4 as shown in FIG. 7.

Therefore, a flow direction of the heat exchanging water between the connection portions P3 and P4 corresponds to a direction toward the connection portion P4 from the connection portion P3 before the connection valve 61 opens, that is, before the system connection operation is performed. After the connection valve 61 opens, that is, the system connection operation is performed, the flow direction of the heat exchanging water between the connection portions P3 and P4 corresponds to a direction toward the connection portion P3 from the connection portion P4. Accordingly, the flow direction of the heat exchanging water between the connection portions P3 and P4 before the connection valve 61 opens, is opposite to the flow direction of the heat exchanging water between the connection portions P3 and P4 after the connection valve 61 opens.

Similarly, when the connection valve 61 opens, that is, the system connection operation is performed while the heat exchanging water flows as shown in FIG. 5, the flow direction of the heat exchanging water changes from the direction toward the connection portion P4 from the connection portion P3 to the direction toward the connection portion P3 from the connection portion P4.

When the engine circulation condition is satisfied, the embodiment apparatus sets a target DEtgt of a duty ratio DE for activating the engine pump 15 such that a flow rate Veng of the heat exchanging water supplied to the engine inner water passage 11W is equal to or larger than a predetermined requested flow rate Veng_req. Hereinafter, the target DEtgt will be referred to as "the target duty ratio DEtgt", and the flow rate Veng will be referred to as "the engine flow rate Veng".

The requested flow rate Veng_req is the flow rate Veng of the heat exchanging water to be supplied to the engine inner water passage 11W for accomplishing a request for the cooling system 10 to prevent the engine 11 from overheating, prevent the heat exchanging water flowing in the cooling system 10 from boiling, etc.

Similarly, when the warming condition is satisfied, the embodiment apparatus sets a target DHtgt of a duty ratio DH for activating the heater pump 32 such that a flow rate Vhc of the heat exchanging water supplied to the core inner water passage 31W is equal to or larger than a predetermined requested flow rate Vhc_req. Hereinafter, the target DHtgt will be referred to as "the target duty ratio DHtgt", and the flow rate Vhc will be referred to as "the core flow rate Vhc".

The requested flow rate Vhc_req is the flow rate Vhc of the heat exchanging water to be supplied to the core inner water passage 31W for maintaining the temperature of the heater core 31 equal to or higher than a predetermined temperature.

In particular, when the embodiment apparatus sets the target duty ratio DEtgt while the connection condition is not satisfied, the embodiment apparatus applies the engine speed NE and the engine load KL to a look-up table MapDE1(NE, KL) to acquire a duty ratio DE1. The embodiment apparatus sets the acquired duty ratio DE1 as the target duty ratio DEtgt. In this case, the acquired duty ratio DE1 is the duty ratio DE capable of controlling the engine flow rate Veng to a flow rate equal to or larger than the requested flow rate Veng_req while the system connection operation is not performed.

On the other hand, when the embodiment apparatus sets the target duty ratio DHtgt while the connection condition is not satisfied, the embodiment apparatus applies the core water temperature TWhc and the vehicle interior set temperature Tset to a look-up table MapDH1(TWhc, Tset) to acquire a duty ratio DH1. The embodiment apparatus sets the acquired duty ratio DH1 as the target duty ratio DHtgt. In this case, the acquired duty ratio DH1 is the duty ratio DH capable of controlling the core flow rate Vhc to a flow rate equal to or larger than the requested flow rate Vhc_req while the system connection operation is not performed.

Further, when the embodiment apparatus sets the target duty ratio DEtgt and the target duty ratio DHtgt while the connection condition is satisfied, the embodiment apparatus applies the engine speed NE, the engine load KL, the core water temperature TWhc, and the vehicle interior set temperature Tset to a look-up table MapDE2(NE, KL, TWhc, Tset) and a look-up table MapDH2(NE, KL, TWhc, Tset), respectively to acquire a duty ratio DE2 and a duty ratio DH2. The embodiment apparatus sets the acquired duty ratio DE2 as the target duty ratio DEtgt and sets the acquired duty ratio DH2 as the target duty ratio DHtgt.

In this case, the acquired duty ratio DE2 is the duty ratio DE capable of controlling the engine flow rate Veng to a flow rate equal to or larger than the requested flow rate Veng_req while the system connection operation is performed. Further, the acquired duty ratio DH2 is the duty ratio DH capable of controlling the core flow rate Vhc to a flow rate equal to or larger than the requested flow rate Vhc_req while the system connection operation is performed.

Then, the embodiment apparatus controls the duty ratio DE such that the duty ratio DE of the engine pump 15 corresponds to the target duty ratio DEtgt, and controls the duty ratio DH such that the duty ratio DH of the heater pump 32 corresponds to the target duty ratio DHtgt. Thereby, the heat exchanging water having a flow rate equal to or larger than the requested flow rate Veng_req, is supplied to the engine inner water passage 11W, and the heat exchanging water having a flow rate equal to or larger than the requested flow rate Vhc_req, is supplied to the core inner water passage 31W.

In this embodiment, when the connection condition is satisfied while the connection valve 61 is closed (that is, the system connection operation is not performed) and the engine flow rate Veng is larger than the core flow rate Vhc, the embodiment apparatus executes a control for opening the connection valve 61, a control for decreasing the duty ratio DE of the engine pump 15, and a control for decreasing the duty ratio DH of the heater pump 32.

Figure 11:
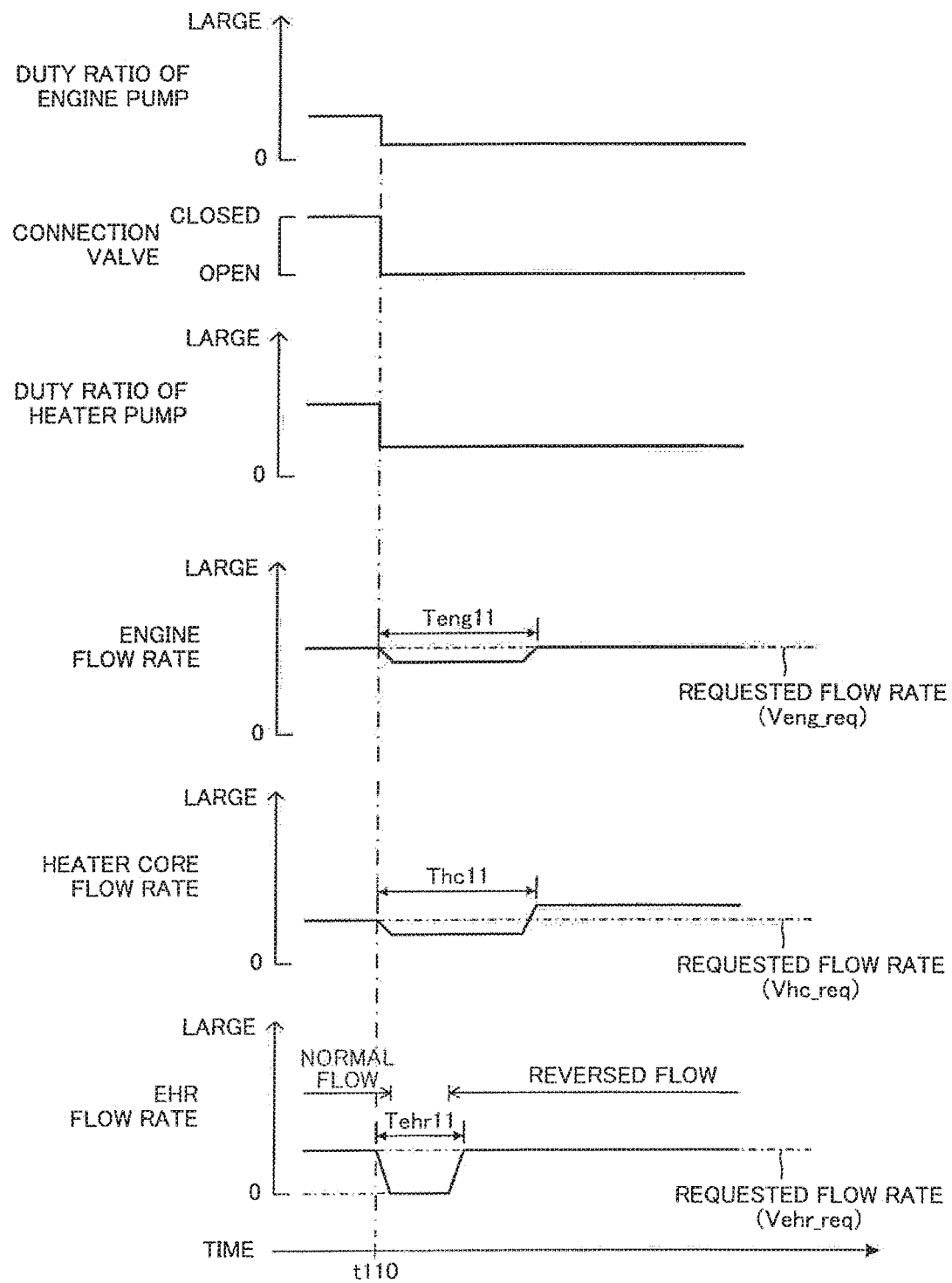
FIG. 11 is a view for showing a time chart of changes of a flow rate of the heat exchanging water, etc. when controls other than controls executed by the control apparatus according to the embodiment, are executed.

In this case, if the control for opening the connection valve 61, the control or decreasing the duty ratio DE of the engine pump 15, and the control for decreasing the duty ratio DR of the heater pump 32 are executed simultaneously, the engine flow rate Veng, the core flow rate Vhc, and a flow rate Vehr of the heat exchanging water flowing through the EHR inner water passage 34W, change as shown in FIG. 11. Hereinafter, the flow rate Vehr will be referred to as "the EHR flow rate Vehr".

As shown in FIG. 11, when the control for opening the connection valve 61, the control for decreasing the duty ratio DE of the engine pump 15, and the control for decreasing the duty ratio DH of the heater pump 32 are executed simultaneously in response to the connection condition being satisfied (a time t110), the engine flow rate Veng decreases below the requested flow rate Veng_req due to decreasing of the duty ratio DE immediately after the controls are executed.

On the other hand, the core flow rate Vhc decreases below the requested flow rate Vhc_req due to decreasing of the duty ratio DH. Also, the EHR flow rate Vehr decrease below a requested flow rate Vehr_req due to decreasing of the duty ratio DH and the heat exchanging water flowing into the second EHR water passage 44 from the connection inflow water passage 62. The requested flow rate Vehr_req is a flow rate Vehr of the heat exchanging water to be supplied to the ERR inner water passage 34W for preventing the boiling of the heat exchanging water flowing through the EHR inner water passage 34W.

Then, the heat exchanging water starts to flow into the second EHR water passage 44 from the connection inflow water passage 62. Due to the heat exchanging water flowing into the second EHR water passage 44 from the connection inflow water passage 62, the EHR flow rate Vehr increases to the requested flow rate Vehr_req.

Then, the amount of the heat exchanging water flowing into the heat pump inflow water passage 40 and the second ERR water passage 44 from the connection inflow water passage 62 increases. Due to the increasing of the heat exchanging water flowing into the heat pump inflow water passage 40 and the second EHR water passage 44 from the connection inflow water passage 62, the engine flow rate Veng increases to the requested flow rate Veng_req, and the core flow rate Vhc increases above the requested flow rate Vhc_req.

When the engine flow rate Veng, the core flow rate Vhc, and the EHR flow rate Vehr change as such, the engine flow rate Veng is smaller than the requested flow rate Veng_req in a period Teng11 between a time when the engine flow rate Veng starts to change and a time when the engine flow rate Veng stops changing. Thus, a requested cooling by the cooling system 10 may not be accomplished, and the heat exchanging water may boil in the engine inner water passage 11W.

Further, the core flow rate Vhc is smaller than the requested flow rate Vhc_req in a period Thc11 between a time when the core flow rate Vhc starts to change and a time when the core flow rate Vhc stops changing. Thus, a temperature of the air supplied to the interior of the vehicle by the blower 35, may decrease temporarily. As a result, persons in the vehicle may feel discomfort.

In addition, the EHR flow rate Vehr is smaller than the requested flow rate Vehr_req in a period Tehr11 between a time when the EHR flow rate Vehr starts to change and a time when the EHR flow rate Vehr stops changing. Thus, the heat exchanging water may boil in the EHR inner water passage 34W.

Accordingly, when the embodiment apparatus executes the control for opening the connection valve 61, the control for decreasing the duty ratio DE of the engine pump 15, and the control for decreasing the duty ratio DH of the heater pump 32 in response to the connection condition being satisfied while the connection valve 61 is closed, the embodiment apparatus sequentially executes the control for opening the connection valve 61, the control for decreasing the duty ratio DH of the heater pump 32, and the control for decreasing the duty ratio DE of the engine pump 15.

Figure 12:
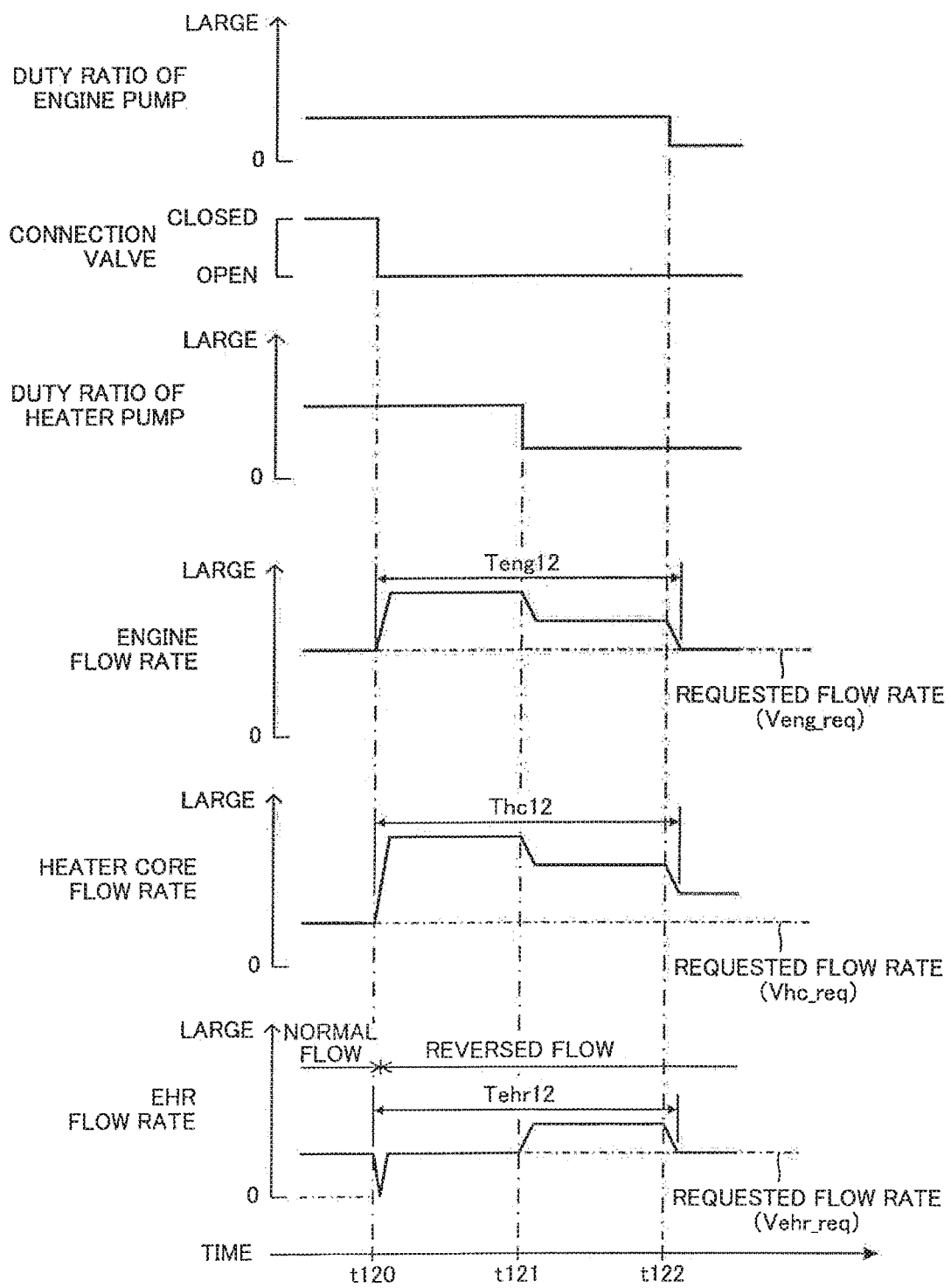
FIG. 12 is a view for showing a time chart of changes of a flow rate of the heat exchanging water, etc. when the control apparatus according to the embodiment executes controls.

Thereby, the engine flow rate Veng, the core flow rate Vhc, and the EHR flow rate Vehr change as shown in FIG. 12. When the connection condition is satisfied at a time t120, the connection valve 61 opens. As a result, a flow resistance of the heat exchanging system decreases. Therefore, the engine flow rate Veng and the core flow rate Vhc increase. On the other hand, the EHR flow rate Vehr decreases. Then, the flow direction of the heat exchanging water through the EHR inner water passage 34W reverses, and the EHR flow rate Vehr increases to the requested flow rate Vehr_req.

Thereafter, the duty ratio DH of the heater water pump 32 decreases at a time t121 when a predetermined time elapses from the time t120. As a result, the engine flow rate Veng and the core flow rate Vhc decrease. In this case, the engine flow rate Veng and the core flow rate Vhc are maintained larger than the requested flow rate Veng_req and the requested flow rate Vhc_req, respectively. On the other hand, the EHR flow rate Vehr increases. In this case, the EHR flow rate Vehr is maintained larger than the requested flow rate Vehr_req.

Thereafter, the duty ratio DE of the engine pump 15 decreases at a time t122 when a predetermined time elapses from the time t121. As a result, the engine flow rate Veng decreases to the requested flow rate Veng_req, and the core flow rate Vhc decreases to a flow rate larger than the requested flow rate Veng_req. In addition, the EHR flow rate Vehr decreases to the requested flow rate Vehr_req.

Thereby, the engine flow rate Veng is larger than the requested flow rate Veng_req in a period Teng12 between the time when the engine flow rate Veng starts to change and the time when the engine flow rate Veng stops changing. Thus, the requested cooling by the cooling system 10 can be accomplished, and the heat exchanging water can be prevented from boiling in the engine inner water passage 11W even when the system connection operation is performed.

Furthermore, the core flow rate Vhc is larger than the requested flow rate Vhc_req in a period Thc12 between the time when the core flow rate Vhc starts to change and the time when the core flow rate Vhc stops changing. Thus, the temperature of the air supplied to the interior of the vehicle by the blower 35 may be prevented from decreasing temporarily even when the system connection operation is performed.

Furthermore, a period when the EHR flow rate Vehr is smaller than the requested flow rate Vehr_req in a period Tehr12 between the time when the EHR flow rate Vehr starts to change and the time when the EHR flow rate Vehr stops changing, is significantly shorter than a period when the EHR flow rate Vehr is smaller than the requested flow rate Vehr_req in the period Tehr11. Thus, the heat exchanging water may be prevented from boiling in the EHR inner water passage 34W even when the system connection operation is performed.

When the embodiment apparatus executes the control for opening the connection valve 61, the control for decreasing the duty ratio DH of the heater pump 32, and the control for decreasing the duty ratio DE of the engine pump 15, the embodiment apparatus may be configured to execute the control for decreasing the duty ratio DH of the heater pump 32 after the core flow rate Vhc has increased after the embodiment apparatus executes the control for opening the connection valve 61. Thereby, the core flow rate Vhe has increased when the duty ratio DH of the heater pump 32 starts to decrease. Thus, the core flow rate Vhc is unlikely to be smaller than the requested flow rate Vhc_req.

<Concrete Operation of Embodiment Apparatus>

Next, a concrete operation of the embodiment apparatus will be described. The CPU of the ECU 90 of the embodiment apparatus is configured or programmed to execute a routine shown by a flowchart in FIG. 13 for controlling the duty ratio DE of the engine pump 15, the duty ratio DH of the heater pump 32, and the activation of the connection valve 61 each time a predetermined time elapses.

Figure 13:
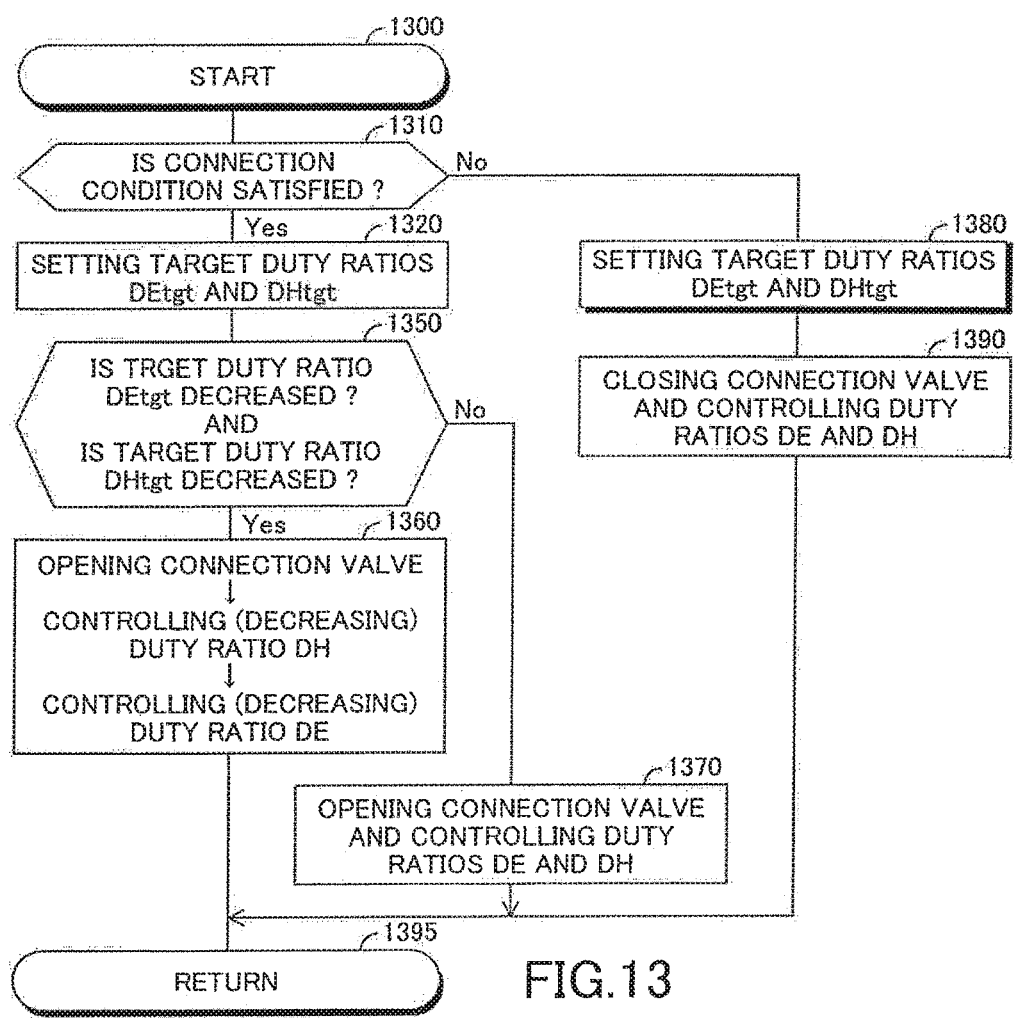
FIG. 13 is a view for showing a flowchart of a routine executed by a CPU of an ECU shown in FIG. 1.

Therefore, at a predetermined timing, the CPU starts a process from a step 1300 in FIG. 13 and then, proceeds with the process to a step 1310 to determine whether the connection condition is satisfied. When the connection condition is satisfied, the CPU determines "Yes" at the step 1310 and then, executes a process of a step 1320 described below. Then, the CPU proceeds with the process to a step 1350.

Step 1320: The CPU applies the engine speed NE, the engine load KL, the core water temperature TWhc, and the vehicle interior set temperature Tset to the look-up table MapDE2(NE, KL, TWhc, Tset) to acquire the duty ratio DE2, and sets the acquired duty ratio DE2 as the target duty ratio DEtgt. In addition, the CPU applies the engine speed NE, the engine load KL, the core water temperature TWhc, and the vehicle interior set temperature Tset to the look-up table MapDH2(NE, KL, D.A/hc, Tset) to acquire the duty ratio DH2, and sets the acquired duty ratio DH2 as the target duty ratio DHtgt.

When the CPU proceeds with the process to the step 1350, the CPU determines whether the target duty ratio DEtgt set at the step 1320 is smaller than the last target duty ratio DEtgt, and the target duty ratio DHtgt set at the step 1320 is smaller than the last target duty ratio DHtgt.

When the target duty ratio DEtgt set at the step 1320 is smaller than the last target duty ratio DEtgt, and the target duty ratio DHtgt set at the step 1320 is smaller than the last target duty ratio DHtgt, the CPU determines "Yes" at the step 1350 and then, executes a process of a step 1360 described below. Then, the CPU proceeds with the process to a step 1395 to terminate this routine once.

Step 1360: The CPU sequentially executes the control for opening the connection valve 61, the control for controlling the duty ratio DH of the heater pump 32 to the target duty ratio DHtgt (that is, the control for decreasing the duty ratio DH to the target duty ratio DHtgt), and the control for controlling the duty ratio DE of the engine pump 15 to the target duty ratio DEtgt (that is, the control for decreasing the duty ratio DE to the target duty ratio DEtgt) in a predetermined time interval.

Thereby, the core flow rate Vhc and the engine flow rate Veng may be prevented from decreasing below the requested flow rate Vhc_req and the requested flow rate Veng_req, respectively when the system connection operation is performed, On the other hand, when the target duty ratio DEtgt set at the step 1320 is larger than the last target duty ratio DEtgt, or the target duty ratio DHtgt set at the step 1320 is larger than the last target duty ratio DHtgt, the CPU determines "No" at the step 1350 and then, executes a process of a step 1370 described below. Then, the CPU proceeds with the process to the step 1395 to terminate this routine once.

Step 1370: The CPU executes the control for opening the connection valve 61, the control for controlling the duty ratio DE of the engine pump 15 to the target duty ratio DEtgt, and the control for controlling the duty ratio DH of the heater pump 32 to the target duty ratio DHtgt simultaneously.

When the connection condition is not satisfied at a time of the CPU executing the process of the step 1310, the CPU determines "No" at the step 1310 and then, proceeds with the process to a step 1380. When the CPU proceeds with the process to the step 1380, the CPU executes a routine shown by a flowchart in FIG. 14.

Figure 14:
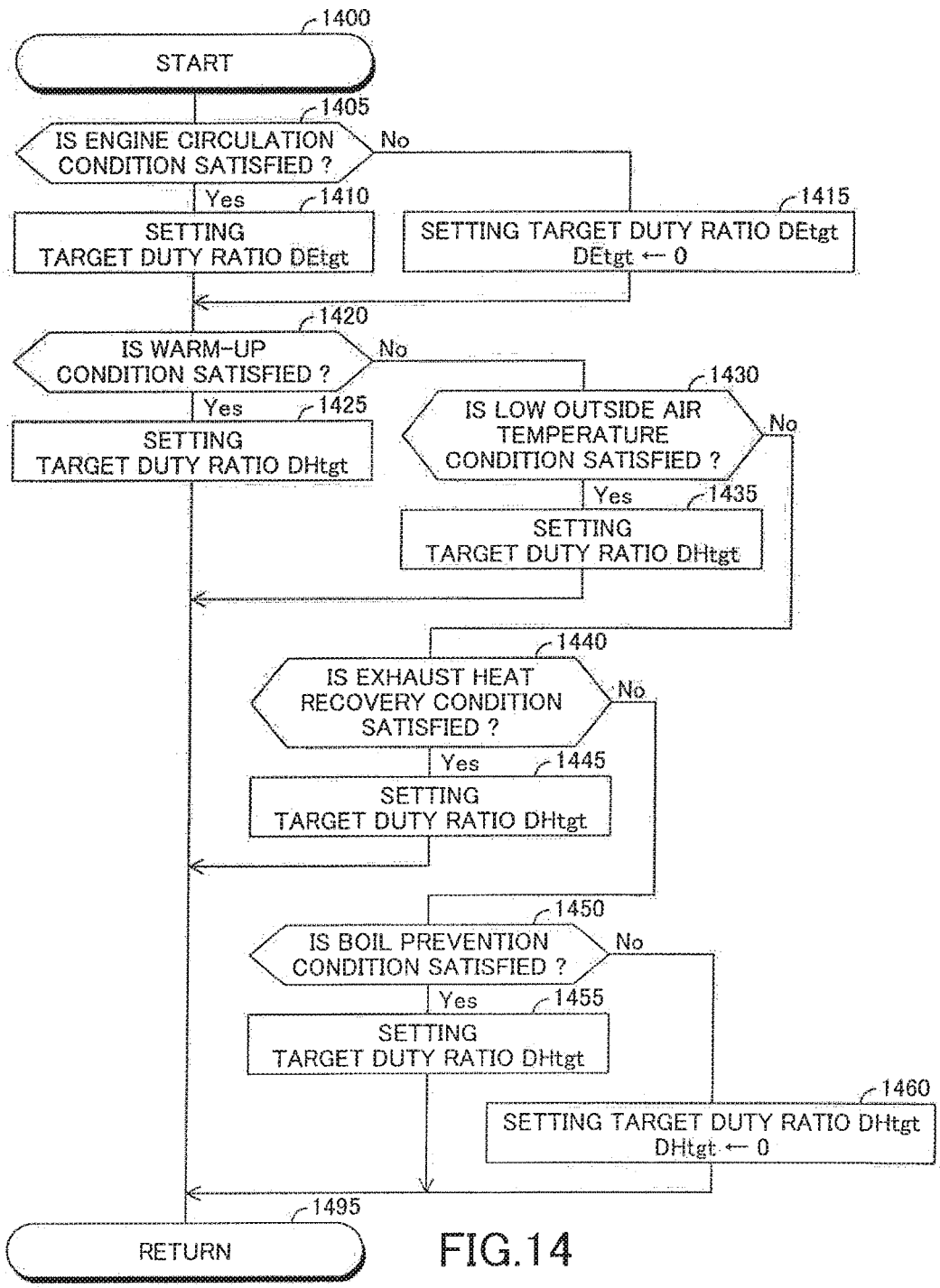
FIG. 14 is a view for showing a flowchart of a routine executed by the CPU.

Therefore, when the CPU proceeds with the process to the step 1380, the CPU starts a process from a step 1400 in FIG. 14 and then, proceeds with the process to a step 1405 to determine whether the engine circulation condition is satisfied. When the engine circulation condition is satisfied, the CPU determines "Yes" at the step 1405 and then, executes a process of a step 1410 described below. Then, the CPU proceeds with the process to a step 1420.

Step 1410: The CPU applies the engine speed NE and the engine load KL to the look-up table MapDE1(NE, KL) to acquire the duty ratio DE1, and sets the acquired duty ratio DE1 as the target duty ratio DEtgt.

On the other hand, when the engine circulation condition is not satisfied, the CPU determines "No" at the step 1405 and then, executes a process of a step 1415 described below. Then, the CPU proceeds with the process to the step 1420.

Step 1415: The CPU sets the target duty ratio DEtgt to zero.

When the CPU proceeds with the process to the step 1420, the CPU determines whether the warming condition is satisfied. When the warming condition is satisfied, the CPU determines "Yes" at the step 1420 and then, executes a process of a step 1425 described below. Then, the CPU proceeds with the process to a step 1390 in FIG. 13 via a step 1495.

Step 1425: The CPU applies the core water temperature TWhc and the vehicle interior set temperature Tset to the look-up table MapDH1(TWhc, Tset) to acquire the duty ratio DH1, and sets the acquired duty ratio DH1 as the target duty ratio DHtgt.

On the other hand, when the warming condition is not satisfied, the CPU determines "No" at the step 1420 and then, proceeds with the process to a step 1430 to determine whether a low outside air temperature condition that a temperature Ta of the outside air is lower than a low temperature threshold (in this embodiment, five degrees C.), is satisfied. The low temperature threshold is set to a relatively low temperature. When the low outside air temperature condition is satisfied, the CPU determines "Yes" at the step 1430 and then, executes a process of a step 1435 described below. Then, the CPU proceeds with the process to the step 1390 in FIG. 13 via the step 1495.

Step 1435: The CPU applies the temperature Ta of the outside air to a look-up table MapDH3(Ta) to acquire a duty ratio DH3 and sets the acquired duty ratio DH3 as the target duty ratio DHtgt.

On the other hand, when the low outside air temperature condition is not satisfied, the CPU determines "No" at the step 1430 and then, proceeds with the process to a step 1440 to determine whether an exhaust heat recovery condition for executing a control for closing the exhaust gas control valve 344 of the exhaust heat recovery device 34, is satisfied. The exhaust heat recovery condition is satisfied when conditions 1 to 3 described below are satisfied.

(Condition 1) The engine 11 operates.
(Condition 2) An output Preq requested to the engine 11, is equal to or smaller than a predetermined value Pth.
(Condition 3) The core water temperature TWhc is lower than a predetermined water temperature TWhc_th (in this embodiment, 70 degrees C.). The predetermined water temperature TWhc_th is set to a temperature capable of preventing the heat exchanging water from boiling due to the activation of the exhaust heat recovery device 34.

When the exhaust heat recovery condition is satisfied, the CPU determines "Yes" at the step 1440 and then, executes a process of a step 1445 described below. Then, the CPU proceeds with the process to the step 1390 in FIG. 13 via the step 1495.

Step 1445: The CPU applies the core water temperature TWhc to a look-up table MapDH4(TWhc) to acquire a duty ratio DH4 and sets the acquired duty ratio DH4 as the target duty ratio DHtgt.

On the other hand, when the exhaust heat recovery condition is not satisfied, the CPU determines "No" at the step 1440 and then, executes a process of a step 1450 to determine whether a boil prevention condition for activating the heater pump 32 for preventing the heat exchanging water from boiling in the EHR inner water passage 34W, is satisfied. The boil prevention condition is satisfied when the EHR water temperature TWehr is equal to or higher than a predetermined water temperature TWehr_th (in this embodiment, 95 degrees C.).

When the boil prevention condition is satisfied, the CPU determines "Yes" at the step 1450 and then, executes a process of a step 1455 described below. Then, the CPU proceeds with the process to the step 1390 in FIG. 13 via the step 1495.

Step 1455: The CPU applies the EHR water temperature TWehr to a look-up table MapDH5(TWehr) to acquire a duty ratio DH5 and sets the acquired duty ratio DH5 as the target duty ratio DHtgt.

On the other hand, when the boil prevention condition is not satisfied, the CPU determines "No" at the step 1450 and then, executes a process of a step 1460 described below. Then, the CPU proceeds with the process to the step 1390 in FIG. 13 via the step 1495.

Step 1460: The CPU sets the target duty ratio DHtgt to zero.

When the CPU proceeds with the process to the step 1390 in FIG. 13, the CPU executes the control for closing the connection valve 61, the control for controlling the duty ratio DE to the target duty ratio DEtgt set at the step 1380 (i.e., the routine shown in FIG. 14), and the control for controlling the duty ratio DH to the target duty ratio DHtgt set at the step 1380 (i.e., the routine shown in FIG. 14), simultaneously. Then, the CPU proceeds with the process to the step 1395 to terminate this routine once.

Figure 15:
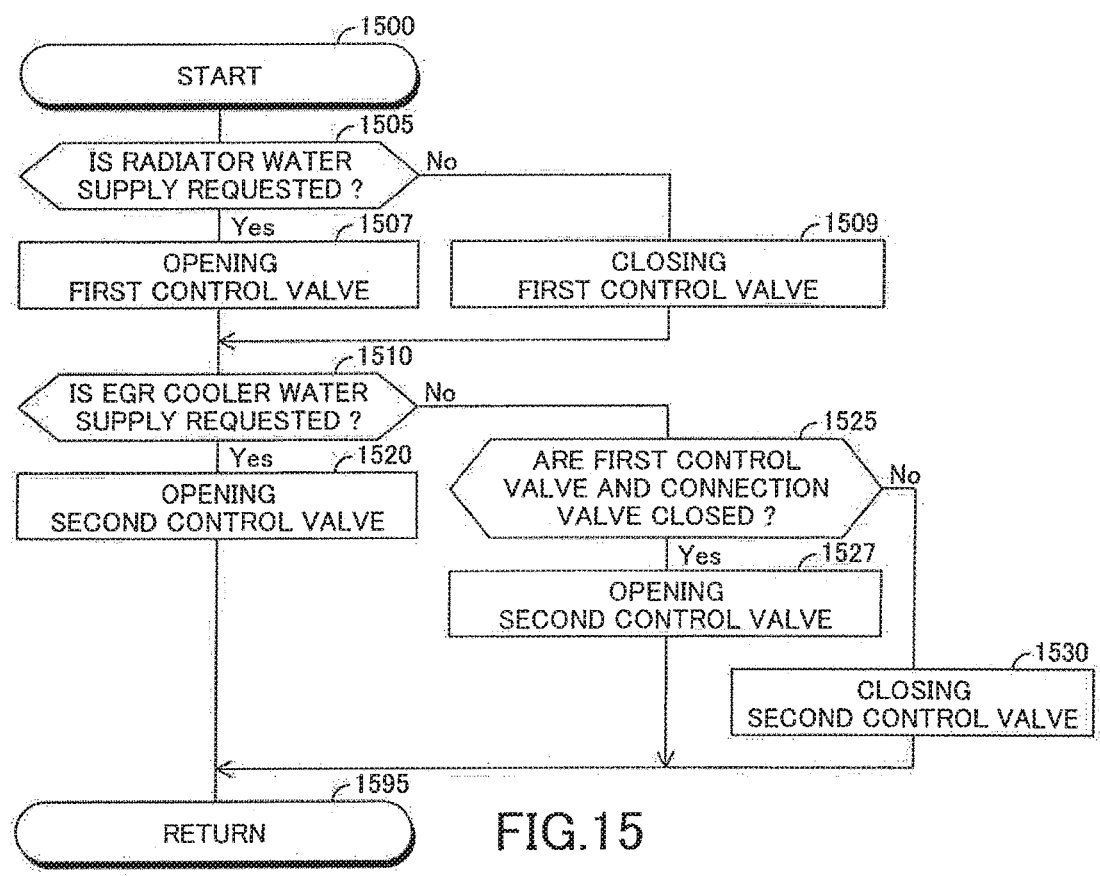
FIG. 15 is a view for showing a flowchart of a routine executed by the CPU.

Further, the CPU is configured or programmed to execute a routine shown by a flowchart in FIG. 15 for opening and closing the first control valve 14r and the second control valve 14e each time the predetermined time elapses. Therefore, at a predetermined timing, the CPU starts a process from a step 1500 in FIG. 15 and then, proceeds with the process to a step 1505 to determine whether a radiator water supply (i.e., a supply of the heat exchanging water to the radiator inner water passage 12W) is requested.

In this embodiment, the radiator water supply is requested when the engine water temperature TWeng is equal to or higher than a predetermined water temperature TWeng_th while the engine 11 operates.

When the radiator water supply is requested, the CPU determines "Yes" at the step 1505 and then, executes a process of a step 1507 described below. Then, the CPU proceeds with the process to a step 1510.

Step 1507: The CPU opens the first control valve 14r. Thereby, the heat exchanging water is supplied to the radiator inner water passage 12W. Thus, the heat exchanging water is cooled by the radiator 12.

On the other hand, when the radiator water supply is not requested, the CPU determines "No" at the step 1505 and then, executes a process of a step 1509 described below. Then, the CPU proceeds with the process to the step 1510.

Step 1509: The CPU closes the first control valve 14r. Thereby, the heat exchanging water is not supplied to the radiator inner water passage 12W.

When the CPU proceeds with the process to the step 1510, the CPU determines whether an EGR cooler water supply (i.e., a supply of the heat exchanging water to the EGR cooler inner water passage 13W) is requested.

In this embodiment, the CPU determines whether an exhaust gas recirculation control for introducing the exhaust gas into the combustion chambers, should be executed, depending on the engine speed NE and the engine load KL. When an engine operation state (i.e., an operation state of the engine 11) defined by the engine speed NE and the engine load KL, is a state that the exhaust gas recirculation control should be executed, the EGR cooler water supply is requested.

When the EGR cooler water supply is requested, the CPU determines "Yes" at the step 1510 and then, executes a process of a step 1520 described below. Then, the CPU proceeds with the process to a step 1595 to terminate this routine once.

Step 1520: The CPU opens the second control valve 14e. Thereby, the heat exchanging water is supplied to the EGR cooler inner water passage 13W. Thus, the EGR gas is cooled by the heat exchanging water.

On the other hand, when the EGR cooler water supply is not requested, the CPU determines "No" at the step 1510 and then, proceeds with the process to a step 1525 to determine whether the first control valve 14r and the connection valve 61 are closed.

When the second control valve 14e is closed while the first control valve 14r and the connection valve 61 are closed, the heat exchanging water does not circulate through the engine water passage. Accordingly, when the first control valve 14r and the connection valve 61 are closed, the CPU determines "Yes" at the step 1525 and then, executes a process of a step 1527 described below. Then, the CPU proceeds with the process to the step 1595 to terminate this routine once.

Step 1527: The CPU opens the second control valve 14e.

On the other hand, when any of the first control valve 14r and the connection valve 61 is open, the CPU determines "No" at the step 1525 and then, executes a process of a step 1530 described below. Then, the CPU proceeds with the process to the step 1595 to terminate this routine once.

Step 1530: The CPU closes the second control valve 14e. Thereby, the heat exchanging water is not supplied to the EGR cooler inner water passage 13W. Thus, the EGR gas is not cooled by the heat exchanging water.

Figure 16:
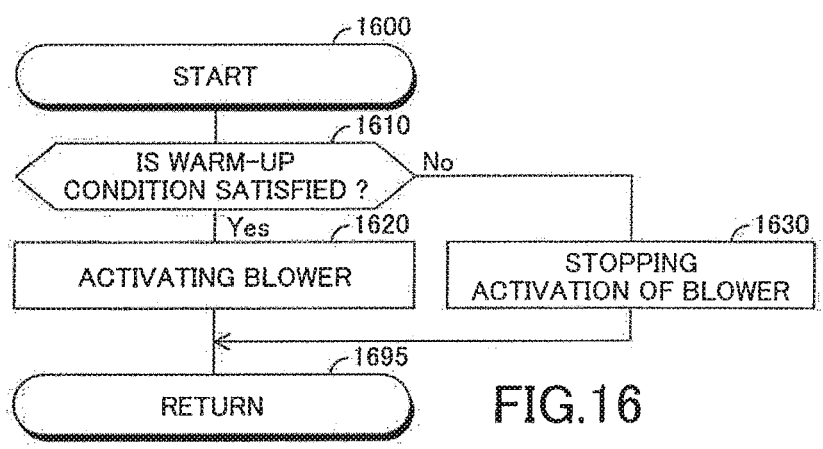
FIG. 16 is a view for showing a flowchart of a routine executed by the CPU.

Further, the CPU is configured or programmed to execute a routine shown by a flowchart in FIG. 16 for controlling the activation of the blower 35 each time the predetermined time elapses. Therefore, at a predetermined timing, the CPU starts a process from a step 1600 in FIG. 16 and then, proceeds with the process to a step 1610 to determine whether the warming condition is satisfied.

When the warming condition is satisfied, the CPU determines "Yes" at the step 1610 and then, executes a process of a step 1620 described below. Then, the CPU proceeds with the process to a step 1695 to terminate this routine once.

Step 1620: The CPU activates the blower 35. Thereby, the air heated or warmed by the heater core 31, is supplied to the interior of the vehicle.

When the warming condition is not satisfied, the CPU determines "No" at the step 1610 and then, executes a process of a step 1630 described below. Then, the CPU proceeds with the process to the step 1695 to terminate this routine once.

Step 1630: The CPU stops activating the blower 35. Thereby, the warm air is not supplied to the interior of the vehicle.

Figure 17:
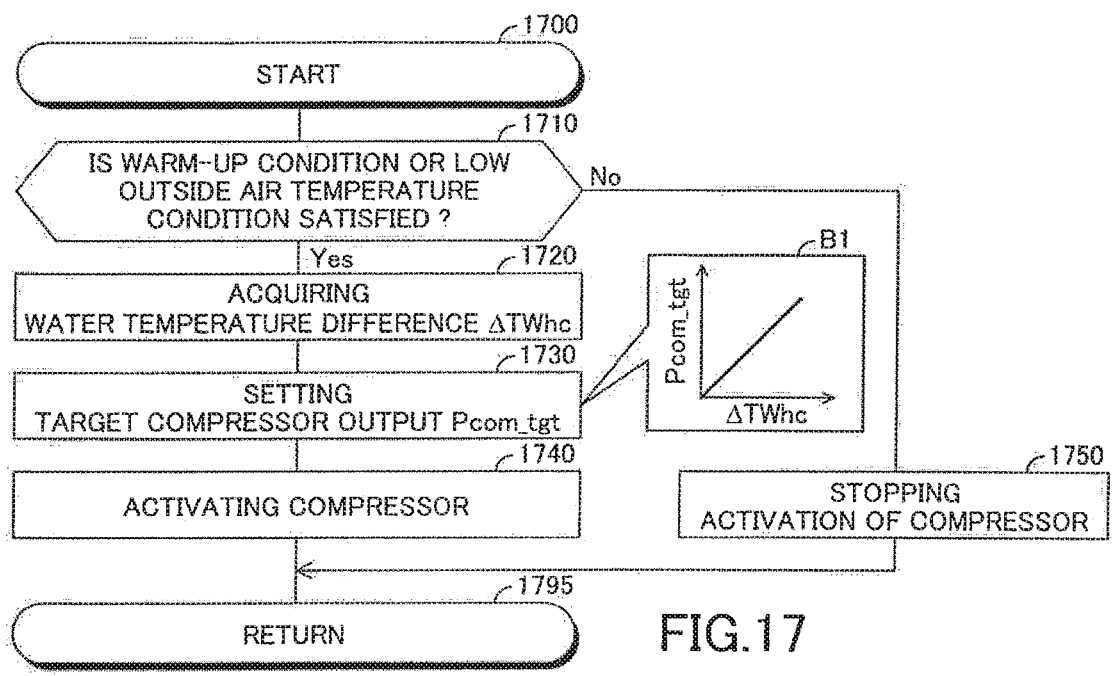
FIG. 17 is a view for showing a flowchart of a routine executed by the CPU.

Further, the CPU is configured or programmed to execute a routine shown by a flowchart in FIG. 17 for controlling the activation of the compressor 335 of the heat pump 33 each time the predetermined time elapses. Therefore, at a predetermined timing, the CPU starts a process from a step 1700 in FIG. 17 and then, proceeds with the process to a step 1710 to determine whether any of the warming condition and the low outside air temperature condition is satisfied.

When any of the warming condition and the low outside air temperature condition is satisfied, the CPU determines "Yes" at the step 1710 and then, executes sequentially processes of steps 1720 to 1740 described below. Then, the CPU proceeds with the process to a step 1795 to terminate this routine once.

Step 1720: The CPU acquires the core water temperature difference ΔTWhc.

Step 1730: The CPU sets a target compressor output Pcom_tgt (i.e., a target of an output of the compressor 335) on the basis of the core water temperature difference ΔTWhc. In this regard, as shown in a block B1 in FIG. 17, the CPU sets the target compressor output Pcom_tgt such that the target compressor output Pcom_tgt increases as the core water temperature difference ΔTWhc increases.

Step 1740: The CPU activates the compressor 335 such that the output of the compressor 335 corresponds to the target compressor output Pcom_tagt. Thereby, the heat exchanging water is heated by the heat pump 33.

On the other hand, when the warming condition and the low outside air temperature condition are not satisfied at a time of the CPU executing the process of the step 1710, the CPU determines "No" at the step 1710 and then, executes a process of a step 1750 described below. Then, the CPU proceeds with the process to the step 1795 to terminate this routine once.

Step 1750: The CPU stops activating the compressor 335. Thereby, the heat exchanging water is not heated by the heat pump 33.

Figure 18:
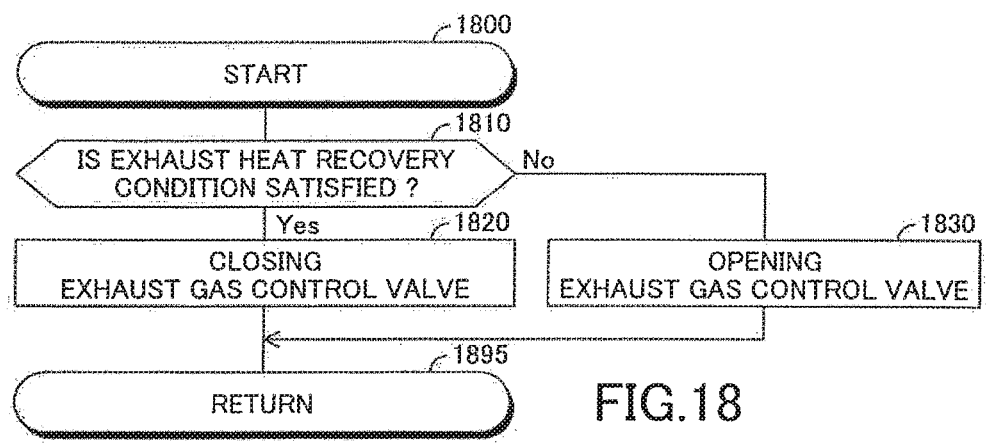
FIG. 18 is a view for showing a flowchart of a routine executed by the CPU.

Further, the CPU is configured or programmed to execute a routine shown by a flowchart in FIG. 18 for opening and closing the exhaust gas control valve 344 of the exhaust heat recovery device 34 each time the predetermined time elapses. Therefore, at a predetermined timing, the CPU starts a process from a step 1800 in FIG. 18 and then, proceeds with the process to a step 1810 to determine whether the exhaust heat recovery condition is satisfied.

When the exhaust heat recovery condition is satisfied, the CPU determines "Yes" at the step 1810 and then, executes a process of a step 1820 described below. Then, the CPU proceeds with the process to a step 1895 to terminate this routine once.

Step 1820: The CPU closes the exhaust gas control valve 344. Thereby, the heat exchanging water is heated by the exhaust heat recovery device 34.

On the other hand, when the exhaust heat recovery condition is not satisfied, the CPU determines "No" at the step 1810 and then, executes a process of a step 1830 described below. Then, the CPU proceeds with the process to the step 1895 to terminate this routine once.

Step 1830: The CPU opens the exhaust gas control valve 344. Thereby, the heat exchanging water is not heated by the exhaust heat recovery device 34.

The concrete operation of the embodiment apparatus has been described.

It should be noted that the present invention is not limited to the aforementioned embodiment, and various modifications can be employed within the scope of the present invention.

For example, when the embodiment apparatus executes the control for opening the connection valve 61, the control for decreasing the duty ratio DE of the engine pump 15, and the control for decreasing the duty ratio DH of the heater pump 32 when the connection condition is satisfied while the connection valve 61 is closed, the embodiment apparatus may be configured to sequentially execute the control for opening the connection valve 61, the control for decreasing the duty ratio DE of the engine pump 15, and the control for decreasing the duty ratio DH of the heater pump 32.

Thereby, the engine flow rate Veng and the core flow rate Vhc may be prevented from being smaller than the requested flow rate Veng_req and the requested flow rate Vhc_req, respectively when the system connection operation is performed.

Further, the embodiment apparatus may be applied to the heat exchanging system mounted on a so-called hybrid vehicle with the internal combustion engine and at least one motor as an apparatus for generating driving force for moving the hybrid vehicle.

Furthermore, the embodiment apparatus may be applied to the heat exchanging system mounted on a so-called plug-in hybrid vehicle with the internal combustion engine and at least one motor as an apparatus for generating driving force for moving the plug-in hybrid vehicle, and a battery for storing electric power to be supplied to the motor, in which the battery can be charged with an external power source.

Further, the embodiment apparatus may be applied to the heat exchanging system mounted on a vehicle in which the engine operation is stopped when a brake pedal is operated, and a moving speed of the vehicle is smaller than a predetermined speed, and then, is restarted when the acceleration pedal is operated.

Furthermore, the heater pump 32 may be provided in the heat pump inflow water passage 40 or the core inflow water passage 41 in place of the core outflow water passage 42.

What is claimed is:

1. A control apparatus of a heat exchanging system, the heat exchanging system including:
    a heater core heating system for heating a heater core by heat exchanging water, the heater core heating air to be supplied to an interior of a vehicle to warm the interior of the vehicle, the heater core heating system including a heater water passage, through which the heat exchanging water flows, a heat exchanger for heating the heat exchanging water flowing through the heater water passage, and a heater pump for flowing the heat exchanging water through the heater water passage;
    an engine cooling system for cooling an internal combustion engine by the heat exchanging water, the engine cooling system including an engine water passage, through which the heat exchanging water flows, and an engine pump for flowing the heat exchanging water through the engine water passage; and
    a connection system for connecting the engine water passage to the heater water passage such that the heat exchanging water flows into the heater water passage from the engine water passage and flows out from the heater water passage into the engine water passage,
    the control apparatus comprising an electronic control unit for controlling activations of the heater pump, the engine pump, and the connection system,
    the electronic control unit being configured to:
        control a heater pump duty ratio for activating the heater pump such that a core flow rate corresponds to a requested core flow rate when a warming condition that a warming of the interior of the vehicle is requested, is satisfied, the core flow rate being a flow rate of the heat exchanging water flowing through the heater core, and the requested core flow rate being a flow rate of the heat exchanging water requested to flow through the heater core;
        control an engine pump duty ratio for activating the engine pump such that an engine flow rate corresponds to a requested engine flow rate when an engine circulation condition that the heat exchanging water is requested to circulate in the engine water passage, is satisfied, the engine flow rate being a flow rate of the heat exchanging water flowing through the engine water passage, and the requested engine flow rate being a flow rate of the heat exchanging water requested to flow through the engine water passage;
        activate the connection system to connect the engine water passage to the heater water passage and control the heater pump duty ratio and the engine pump duty ratio such that the core flow rate corresponds to the requested core flow rate and the engine flow rate corresponds to the requested engine flow rate when a connection condition including a condition that the warming condition is satisfied, is satisfied,
    wherein the electronic control unit is configured to execute a control for activating the connection system to connect the engine water passage to the heater water passage and then, execute a control for decreasing the heater pump duty ratio and a control for decreasing the engine pump duty ratio when a particular condition that the control for decreasing the heater pump duty ratio and the control for decreasing the engine pump duty ratio are requested to be executed in order to control the core flow rate to the requested core flow rate and the engine flow rate to the requested, engine flow rate after the engine water passage is connected to the heater water passage by the connection system, is satisfied.

2. The control apparatus of the heat exchanging system according to claim 1, wherein the electronic control unit is configured to execute the control for decreasing the heater pump duty ratio and the control for decreasing the engine pump duty ratio after the core flow rate starts to increase after the electronic control unit executes the control for activating the connection system to connect the engine water passage to the heater water passage when the particular condition is satisfied.

3. The control apparatus of the heat exchanging system according to claim 1, wherein the heat exchanging system is configured such that a flow direction of the heat exchanging water in a particular water passage portion of the heater water passage between a portion of the heater water passage into which the heat exchanging water flows from the engine water passage and a portion of the heater water passage from which the heat exchanging water flows out toward the engine water passage when the engine water passage is not connected to the heater water passage, is opposite to the flow direction of the heat exchanging water in the particular water passage portion when the engine water passage is connected to the heater water passage,
    the heater core heating system includes an exhaust heat recovery device in the particular water passage, the exhaust heat recovery device being configured to heat the heat exchanging water circulating in the heater water passage by heat of exhaust gas discharged from the internal combustion engine, and
    the electronic control unit is configured to execute the control for decreasing the engine pump duty ratio after the electronic control unit executes the control for decreasing the heater pump duty ratio when the particular condition is satisfied.

4. The control apparatus of the heat exchanging system according to claim 1, wherein the connection condition includes a condition that the engine circulation condition is satisfied.

5. The control apparatus of the heat exchanging system according to claim 1, wherein the connection condition includes a condition that a first temperature of the heat exchanging water circulating in the engine water passage is higher than a second temperature of the heat exchanging water circulating in the heater water passage when the engine water passage is not connected to the heater water passage.

6. The control apparatus of the heat exchanging system according to claim 1, wherein the engine water passage includes an engine inner water passage formed in the internal combustion engine, and
the engine circulation condition includes a condition that a third temperature of the heat exchanging water in the engine inner water passage is higher than or equal to a predetermined temperature.

7. The control apparatus of the heat exchanging system according to claim 1, wherein the engine circulation condition includes a condition that a difference between a temperature of one portion of the internal combustion engine and a temperature of another portion of the internal combustion engine is larger than or equal to a predetermined temperature difference.

8. The control apparatus of the heat exchanging system according to claim 1, wherein the engine circulation condition includes a condition that the internal combustion engine operates.

* * * * *